United States Patent
Dean et al.

(10) Patent No.: US 9,607,336 B1
(45) Date of Patent: Mar. 28, 2017

(54) PROVIDING CREDIT INQUIRY ALERTS

(75) Inventors: Michael John Dean, Torrance, CA (US); Mark Joseph Kapczynski, Santa Monica, CA (US)

(73) Assignee: ConsumerInfo.com, Inc., Costa Mesa, CA (US)

( * ) Notice: Subject to any disclaimer, the term of this patent is extended or adjusted under 35 U.S.C. 154(b) by 0 days.

(21) Appl. No.: 13/525,061

(22) Filed: Jun. 15, 2012

Related U.S. Application Data

(60) Provisional application No. 61/497,826, filed on Jun. 16, 2011, provisional application No. 61/504,955, filed on Jul. 6, 2011, provisional application No. 61/540,654, filed on Sep. 29, 2011.

(51) Int. Cl.
G06Q 40/00 (2012.01)
G06Q 40/02 (2012.01)

(52) U.S. Cl.
CPC ................... *G06Q 40/025* (2013.01)

(58) Field of Classification Search
CPC ....... G06Q 40/025; G06Q 40/00; G06Q 40/02
USPC .................... 235/379, 380; 705/39
See application file for complete search history.

(56) References Cited

U.S. PATENT DOCUMENTS

| | | | |
|---|---|---|---|
| 4,795,890 A | 1/1989 | Goldman | |
| 4,891,503 A | 1/1990 | Jewell | |
| 4,977,595 A | 12/1990 | Ohta et al. | |
| 4,989,141 A | 1/1991 | Lyons et al. | |
| 5,351,293 A | 9/1994 | Michener et al. | |
| 5,590,038 A | 12/1996 | Pitroda | |
| 5,640,577 A | 6/1997 | Scharmer | |
| 5,659,725 A | 8/1997 | Levy et al. | |
| 5,659,731 A | 8/1997 | Gustafson | |
| 5,715,314 A | 2/1998 | Payne et al. | |
| 5,719,941 A | 2/1998 | Swift et al. | |
| 5,754,632 A | 5/1998 | Smith | |
| 5,832,068 A | 11/1998 | Smith | |
| 5,844,218 A | 12/1998 | Kawan et al. | |
| 5,881,131 A | 3/1999 | Farris et al. | |
| 5,903,830 A | 5/1999 | Joao et al. | |
| 5,956,693 A | 9/1999 | Geerlings | |

(Continued)

FOREIGN PATENT DOCUMENTS

| | | |
|---|---|---|
| EP | 1 028 401 | 8/2000 |
| EP | 1 239 378 | 1/2002 |

(Continued)

OTHER PUBLICATIONS

Information Sharing in Credit Markets. Pagano and Jappelli. Journal of Finance. Dec. 1993.*

(Continued)

*Primary Examiner* — Alexander Kalinowski
*Assistant Examiner* — John Preston
(74) *Attorney, Agent, or Firm* — Knobbe, Martens, Olson & Bear, LLP

(57) ABSTRACT

Methods and systems are provided for generating and delivering an alert to an individual regarding a credit inquiry. For example, an inquiry request may be received that includes a request for credit data associated with an individual. An alert may then be generated and provided to the individual based on retrieved contact information associated with the individual. In some embodiments, the alert is generated regardless of whether the inquiry causes a change to credit data associated with the individual.

9 Claims, 5 Drawing Sheets

(56) References Cited

U.S. PATENT DOCUMENTS

| | | |
|---|---|---|
| 5,966,695 A | 10/1999 | Melchione et al. |
| 5,999,596 A | 12/1999 | Walker et al. |
| 6,021,397 A | 2/2000 | Jones et al. |
| 6,021,943 A | 2/2000 | Chastain |
| 6,026,440 A | 2/2000 | Shrader et al. |
| 6,038,551 A | 3/2000 | Barlow et al. |
| 6,072,894 A | 6/2000 | Payne |
| 6,073,106 A | 6/2000 | Rozen et al. |
| 6,073,140 A | 6/2000 | Morgan et al. |
| 6,085,242 A | 7/2000 | Chandra |
| 6,119,103 A | 9/2000 | Basch et al. |
| 6,128,602 A | 10/2000 | Northington et al. |
| 6,157,707 A | 12/2000 | Baulier et al. |
| 6,161,139 A | 12/2000 | Win et al. |
| 6,182,068 B1 | 1/2001 | Culliss |
| 6,182,229 B1 | 1/2001 | Nielsen |
| 6,253,202 B1 | 6/2001 | Gilmour |
| 6,254,000 B1 | 7/2001 | Degen et al. |
| 6,263,447 B1 | 7/2001 | French et al. |
| 6,269,369 B1 | 7/2001 | Robertson |
| 6,282,658 B2 | 8/2001 | French et al. |
| 6,311,169 B2 | 10/2001 | Duhon |
| 6,321,339 B1 | 11/2001 | French et al. |
| 6,327,578 B1 | 12/2001 | Linehan |
| 6,343,279 B1 | 1/2002 | Bissonette et al. |
| 6,356,937 B1 | 3/2002 | Montville et al. |
| 6,397,212 B1 | 5/2002 | Biffar |
| 6,453,353 B1 | 9/2002 | Win et al. |
| 6,457,012 B1 | 9/2002 | Jatkowski |
| 6,463,533 B1 | 10/2002 | Calamera et al. |
| 6,473,740 B2 | 10/2002 | Cockril et al. |
| 6,496,936 B1 | 12/2002 | French et al. |
| 6,523,021 B1 | 2/2003 | Monberg et al. |
| 6,523,041 B1 | 2/2003 | Morgan et al. |
| 6,539,377 B1 | 3/2003 | Culliss |
| 6,564,210 B1 | 5/2003 | Korda et al. |
| 6,574,736 B1 | 6/2003 | Andrews |
| 6,581,059 B1 | 6/2003 | Barrett et al. |
| 6,601,173 B1 | 7/2003 | Mohler |
| 6,629,245 B1 | 9/2003 | Stone et al. |
| 6,647,383 B1 | 11/2003 | August et al. |
| 6,658,393 B1 | 12/2003 | Basch et al. |
| 6,714,944 B1 | 3/2004 | Shapiro et al. |
| 6,725,381 B1 | 4/2004 | Smith et al. |
| 6,734,886 B1 | 5/2004 | Hagan et al. |
| 6,750,985 B2 | 6/2004 | Rhoads |
| 6,754,665 B1 | 6/2004 | Futagami et al. |
| 6,766,327 B2 | 7/2004 | Morgan, Jr. et al. |
| 6,766,946 B2 | 7/2004 | Iida et al. |
| 6,782,379 B2 | 8/2004 | Lee |
| 6,796,497 B2 | 9/2004 | Benkert et al. |
| 6,804,346 B1 | 10/2004 | Mewhinney |
| 6,805,287 B2 | 10/2004 | Bishop et al. |
| 6,816,850 B2 | 11/2004 | Culliss |
| 6,816,871 B2 | 11/2004 | Lee |
| 6,845,448 B1 | 1/2005 | Chaganti et al. |
| 6,857,073 B2 | 2/2005 | French et al. |
| 6,871,287 B1 | 3/2005 | Ellingson |
| 6,892,307 B1 | 5/2005 | Wood et al. |
| 6,900,731 B2 | 5/2005 | Kreiner et al. |
| 6,907,408 B2 | 6/2005 | Angel |
| 6,908,030 B2 | 6/2005 | Rajasekaran et al. |
| 6,910,624 B1 | 6/2005 | Natsuno |
| 6,928,487 B2 | 8/2005 | Eggebraaten et al. |
| 6,934,714 B2 | 8/2005 | Meinig |
| 6,934,858 B2 | 8/2005 | Woodhill |
| 6,947,989 B2 | 9/2005 | Gullotta et al. |
| 6,950,807 B2 | 9/2005 | Brock |
| 6,950,858 B2 | 9/2005 | Ogami |
| 6,965,881 B1 | 11/2005 | Brickell et al. |
| 6,968,319 B1 | 11/2005 | Remington et al. |
| 6,973,462 B2 | 12/2005 | Dattero et al. |
| 6,983,381 B2 | 1/2006 | Jerdonek |
| 6,985,887 B1 | 1/2006 | Sunstein et al. |
| 6,988,085 B2 | 1/2006 | Hedy |
| 6,999,941 B1 | 2/2006 | Agarwal |
| 7,016,907 B2 | 3/2006 | Boreham et al. |
| 7,028,013 B2 | 4/2006 | Saeki |
| 7,028,052 B2 | 4/2006 | Chapman et al. |
| 7,039,607 B2 | 5/2006 | Watarai et al. |
| 7,043,476 B2 | 5/2006 | Robson |
| 7,058,817 B1 | 6/2006 | Ellmore |
| 7,059,531 B2 | 6/2006 | Beenau et al. |
| 7,062,475 B1 | 6/2006 | Szabo et al. |
| 7,076,462 B1 | 7/2006 | Nelson et al. |
| 7,085,727 B2 | 8/2006 | VanOrman |
| 7,107,241 B1 | 9/2006 | Pinto |
| 7,121,471 B2 | 10/2006 | Beenau et al. |
| 7,124,144 B2 | 10/2006 | Christianson et al. |
| 7,133,935 B2 | 11/2006 | Hedy |
| 7,154,375 B2 | 12/2006 | Beenau et al. |
| 7,155,739 B2 | 12/2006 | Bari et al. |
| 7,194,416 B1 | 3/2007 | Provost et al. |
| 7,200,602 B2 | 4/2007 | Jonas |
| 7,209,895 B2 | 4/2007 | Kundtz et al. |
| 7,219,107 B2 | 5/2007 | Beringer |
| 7,222,369 B2 | 5/2007 | Vering et al. |
| 7,234,156 B2 | 6/2007 | French et al. |
| 7,234,160 B2 | 6/2007 | Vogel et al. |
| 7,237,267 B2 | 6/2007 | Rayes et al. |
| 7,243,369 B2 | 7/2007 | Bhat et al. |
| 7,246,067 B2 | 7/2007 | Austin et al. |
| 7,246,740 B2 | 7/2007 | Swift et al. |
| 7,249,113 B1 | 7/2007 | Continelli et al. |
| 7,263,497 B1 | 8/2007 | Wiser et al. |
| 7,289,971 B1 | 10/2007 | O'Neil et al. |
| 7,303,120 B2 | 12/2007 | Beenau et al. |
| 7,310,611 B2 | 12/2007 | Shibuya et al. |
| 7,314,167 B1 | 1/2008 | Kiliccote |
| 7,328,233 B2 | 2/2008 | Salim et al. |
| 7,333,635 B2 | 2/2008 | Tsantes et al. |
| 7,340,679 B2 | 3/2008 | Botscheck et al. |
| 7,343,149 B2 | 3/2008 | Benco |
| 7,343,295 B2 | 3/2008 | Pomerance |
| 7,356,516 B2 | 4/2008 | Richey et al. |
| 7,370,044 B2 | 5/2008 | Mulhern et al. |
| 7,383,988 B2 | 6/2008 | Slonecker, Jr. |
| 7,389,913 B2 | 6/2008 | Starrs |
| 7,403,942 B1 | 7/2008 | Bayliss |
| 7,433,864 B2 | 10/2008 | Malik |
| 7,437,679 B2 | 10/2008 | Uemura et al. |
| 7,444,414 B2 | 10/2008 | Foster et al. |
| 7,444,518 B1 | 10/2008 | Dharmarajan et al. |
| 7,451,113 B1 | 11/2008 | Kasower |
| 7,458,508 B1 | 12/2008 | Shao et al. |
| 7,460,857 B2 | 12/2008 | Roach, Jr. |
| 7,467,401 B2 | 12/2008 | Cicchitto |
| 7,478,157 B2 | 1/2009 | Bohrer et al. |
| 7,480,631 B1 | 1/2009 | Merced et al. |
| 7,490,356 B2 | 2/2009 | Lieblich et al. |
| 7,503,489 B2 | 3/2009 | Heffez |
| 7,509,117 B2 | 3/2009 | Yum |
| 7,512,221 B2 | 3/2009 | Toms |
| 7,529,698 B2 | 5/2009 | Joao |
| 7,530,097 B2 | 5/2009 | Casco-Arias et al. |
| 7,542,993 B2 | 6/2009 | Satterfield et al. |
| 7,543,739 B2 | 6/2009 | Brown et al. |
| 7,546,271 B1 | 6/2009 | Chmielewski et al. |
| 7,548,886 B2 | 6/2009 | Kirkland et al. |
| 7,552,467 B2 | 6/2009 | Lindsay |
| 7,562,184 B2 | 7/2009 | Henmi et al. |
| 7,562,814 B1 | 7/2009 | Shao et al. |
| 7,571,473 B1 | 8/2009 | Boydstun et al. |
| 7,575,157 B2 | 8/2009 | Barnhardt et al. |
| 7,577,665 B2 | 8/2009 | Ramer et al. |
| 7,577,934 B2 | 8/2009 | Anonsen et al. |
| 7,580,884 B2 | 8/2009 | Cook |
| 7,581,112 B2 | 8/2009 | Brown et al. |
| 7,584,146 B1 | 9/2009 | Duhon |
| 7,587,366 B2 | 9/2009 | Grim, III et al. |
| 7,587,368 B2 | 9/2009 | Felsher |
| 7,603,701 B2 | 10/2009 | Gaucas |
| 7,606,725 B2 | 10/2009 | Robertson et al. |
| 7,610,216 B1 | 10/2009 | May et al. |

(56) References Cited

U.S. PATENT DOCUMENTS

| | | |
|---|---|---|
| 7,613,600 B2 | 11/2009 | Krane |
| 7,620,596 B2 | 11/2009 | Knudson et al. |
| 7,623,844 B2 | 11/2009 | Herrmann et al. |
| 7,634,737 B2 | 12/2009 | Beringer et al. |
| 7,647,344 B2 | 1/2010 | Skurtovich, Jr. et al. |
| 7,653,592 B1 | 1/2010 | Flaxman et al. |
| 7,653,600 B2 | 1/2010 | Gustin |
| 7,653,688 B2 | 1/2010 | Bittner |
| 7,672,833 B2 | 3/2010 | Blume et al. |
| 7,685,209 B1 | 3/2010 | Norton et al. |
| 7,686,214 B1 | 3/2010 | Shao et al. |
| 7,689,487 B1 | 3/2010 | Britto et al. |
| 7,689,505 B2 | 3/2010 | Kasower |
| 7,689,563 B1 | 3/2010 | Jacobson |
| 7,690,032 B1 | 3/2010 | Peirce |
| 7,698,214 B1 | 4/2010 | Lindgren |
| 7,698,217 B1 | 4/2010 | Phillips et al. |
| 7,698,445 B2 | 4/2010 | Fitzpatrick et al. |
| 7,707,271 B2 | 4/2010 | Rudkin et al. |
| 7,708,190 B2 | 5/2010 | Brandt et al. |
| 7,711,635 B2 | 5/2010 | Steele et al. |
| 7,725,385 B2 | 5/2010 | Royer et al. |
| 7,730,078 B2 | 6/2010 | Schwabe et al. |
| 7,739,139 B2 | 6/2010 | Robertson et al. |
| 7,747,494 B1 | 6/2010 | Kothari et al. |
| 7,747,520 B2 | 6/2010 | Livermore et al. |
| 7,747,521 B2 | 6/2010 | Serio |
| 7,761,384 B2 | 7/2010 | Madhogarhia |
| 7,761,568 B1 | 7/2010 | Levi et al. |
| 7,765,166 B2 | 7/2010 | Beringer et al. |
| 7,765,311 B2 | 7/2010 | Itabashi et al. |
| 7,769,696 B2 | 8/2010 | Yoda |
| 7,769,697 B2 | 8/2010 | Fieschi et al. |
| 7,774,270 B1 | 8/2010 | MacCloskey |
| 7,788,040 B2 | 8/2010 | Haskell et al. |
| 7,792,715 B1 | 9/2010 | Kasower |
| 7,793,835 B1 | 9/2010 | Coggeshall et al. |
| 7,797,725 B2 | 9/2010 | Lunt et al. |
| 7,801,956 B1 | 9/2010 | Cumberbatch et al. |
| 7,802,104 B2 | 9/2010 | Dickinson |
| 7,810,036 B2 | 10/2010 | Bales et al. |
| 7,818,228 B1 * | 10/2010 | Coulter ............................ 705/35 |
| 7,827,115 B2 | 11/2010 | Weller et al. |
| 7,841,004 B1 | 11/2010 | Balducci et al. |
| 7,841,008 B1 | 11/2010 | Cole et al. |
| 7,844,520 B1 | 11/2010 | Franklin |
| 7,849,014 B2 | 12/2010 | Erikson |
| 7,853,493 B2 | 12/2010 | DeBie et al. |
| 7,865,958 B2 | 1/2011 | Lieblich et al. |
| 7,870,078 B2 | 1/2011 | Clark et al. |
| 7,877,304 B1 | 1/2011 | Coulter |
| 7,877,784 B2 | 1/2011 | Chow et al. |
| 7,908,242 B1 | 3/2011 | Achanta |
| 7,909,246 B2 | 3/2011 | Hogg et al. |
| 7,912,865 B2 | 3/2011 | Akerman et al. |
| 7,958,046 B2 | 6/2011 | Doerner et al. |
| 7,966,192 B2 | 6/2011 | Pagliari et al. |
| 7,970,679 B2 | 6/2011 | Kasower |
| 7,975,299 B1 | 7/2011 | Balducci et al. |
| 7,979,908 B2 | 7/2011 | Millwee |
| 7,983,932 B2 | 7/2011 | Kane |
| 7,991,689 B1 | 8/2011 | Brunzell et al. |
| 8,001,042 B1 | 8/2011 | Brunzell et al. |
| 8,001,153 B2 | 8/2011 | Skurtovich, Jr. et al. |
| 8,001,235 B2 | 8/2011 | Russ et al. |
| 8,032,932 B2 | 10/2011 | Speyer et al. |
| 8,037,097 B2 | 10/2011 | Guo et al. |
| 8,055,904 B1 | 11/2011 | Cato et al. |
| 8,060,424 B2 | 11/2011 | Kasower |
| 8,060,916 B2 | 11/2011 | Bajaj et al. |
| 8,065,233 B2 | 11/2011 | Lee et al. |
| 8,078,453 B2 | 12/2011 | Shaw |
| 8,078,524 B2 | 12/2011 | Crawford et al. |
| 8,078,881 B1 | 12/2011 | Liu |
| 8,099,341 B2 | 1/2012 | Varghese |
| 8,104,679 B2 | 1/2012 | Brown |
| 8,127,982 B1 | 3/2012 | Casey et al. |
| 8,127,986 B1 | 3/2012 | Taylor et al. |
| 8,131,777 B2 | 3/2012 | McCullough |
| 8,175,889 B1 | 5/2012 | Girulat et al. |
| 8,195,549 B2 | 6/2012 | Kasower |
| 8,224,723 B2 | 7/2012 | Bosch et al. |
| 8,234,498 B2 | 7/2012 | Britti et al. |
| 8,244,848 B1 | 8/2012 | Narayanan et al. |
| 8,281,372 B1 | 10/2012 | Vidal |
| 8,285,613 B1 | 10/2012 | Coulter |
| 8,285,656 B1 | 10/2012 | Chang et al. |
| 8,291,218 B2 | 10/2012 | Garcia et al. |
| 8,312,033 B1 | 11/2012 | McMillan |
| 8,327,429 B2 | 12/2012 | Speyer et al. |
| 8,355,967 B2 | 1/2013 | Debie et al. |
| 8,374,973 B2 | 2/2013 | Herbrich et al. |
| 8,442,886 B1 | 5/2013 | Haggerty et al. |
| 8,447,016 B1 | 5/2013 | Kugler et al. |
| 8,456,293 B1 | 6/2013 | Trundle et al. |
| 8,464,939 B1 | 6/2013 | Taylor et al. |
| 8,478,674 B1 | 7/2013 | Kapczynski et al. |
| 8,484,186 B1 | 7/2013 | Kapczynski et al. |
| 8,515,828 B1 | 8/2013 | Wolf et al. |
| 8,515,844 B2 | 8/2013 | Kasower |
| 8,527,357 B1 | 9/2013 | Ganesan |
| 8,527,417 B2 | 9/2013 | Telle et al. |
| 8,527,773 B1 | 9/2013 | Metzger |
| 8,533,118 B2 | 9/2013 | Weller et al. |
| 8,578,496 B1 | 11/2013 | Krishnappa |
| 8,600,886 B2 | 12/2013 | Ramavarjula et al. |
| 8,601,602 B1 | 12/2013 | Zheng |
| 8,606,234 B2 | 12/2013 | Pei et al. |
| 8,606,694 B2 | 12/2013 | Campbell et al. |
| 8,630,938 B2 | 1/2014 | Cheng et al. |
| 8,646,051 B2 | 2/2014 | Paden et al. |
| 8,705,718 B2 | 4/2014 | Baniak et al. |
| 8,725,613 B1 | 5/2014 | Celka et al. |
| 8,744,956 B1 | 6/2014 | DiChiara et al. |
| 8,768,914 B2 | 7/2014 | Scriffignano et al. |
| 8,781,953 B2 | 7/2014 | Kasower |
| 8,782,217 B1 | 7/2014 | Arone et al. |
| 8,818,888 B1 | 8/2014 | Kapczynski et al. |
| 8,856,894 B1 | 10/2014 | Dean et al. |
| 8,931,058 B2 | 1/2015 | DiChiara et al. |
| 8,954,459 B1 | 2/2015 | McMillan et al. |
| 8,972,400 B1 | 3/2015 | Kapczynski et al. |
| 9,106,691 B1 | 8/2015 | Burger et al. |
| 9,147,042 B1 | 9/2015 | Haller et al. |
| 2001/0001877 A1 | 5/2001 | French et al. |
| 2001/0029482 A1 | 10/2001 | Tealdi et al. |
| 2001/0039532 A1 | 11/2001 | Coleman, Jr. et al. |
| 2001/0042785 A1 | 11/2001 | Walker et al. |
| 2001/0044729 A1 | 11/2001 | Pomerance |
| 2001/0044756 A1 | 11/2001 | Watkins et al. |
| 2001/0049274 A1 | 12/2001 | Degraeve |
| 2002/0004736 A1 | 1/2002 | Roundtree et al. |
| 2002/0013827 A1 | 1/2002 | Edstrom et al. |
| 2002/0013899 A1 | 1/2002 | Faul |
| 2002/0026519 A1 | 2/2002 | Itabashi et al. |
| 2002/0032635 A1 | 3/2002 | Harris et al. |
| 2002/0033846 A1 | 3/2002 | Balasubramanian et al. |
| 2002/0035684 A1 | 3/2002 | Vogel et al. |
| 2002/0045154 A1 | 4/2002 | Wood et al. |
| 2002/0059201 A1 | 5/2002 | Work |
| 2002/0069122 A1 | 6/2002 | Yun et al. |
| 2002/0077964 A1 | 6/2002 | Brody et al. |
| 2002/0087460 A1 | 7/2002 | Hornung |
| 2002/0099635 A1 | 7/2002 | Guiragosian |
| 2002/0103933 A1 | 8/2002 | Garon et al. |
| 2002/0111816 A1 | 8/2002 | Lortscher et al. |
| 2002/0120757 A1 | 8/2002 | Sutherland et al. |
| 2002/0128962 A1 | 9/2002 | Kasower |
| 2002/0133365 A1 | 9/2002 | Grey et al. |
| 2002/0133462 A1 | 9/2002 | Shteyn |
| 2002/0138470 A1 | 9/2002 | Zhou |
| 2002/0143943 A1 | 10/2002 | Lee et al. |
| 2002/0147801 A1 | 10/2002 | Gullotta et al. |
| 2002/0157029 A1 | 10/2002 | French et al. |

(56) References Cited

U.S. PATENT DOCUMENTS

| | | |
|---|---|---|
| 2002/0169747 A1 | 11/2002 | Chapman et al. |
| 2002/0173994 A1 | 11/2002 | Ferguson, III |
| 2002/0198800 A1 | 12/2002 | Shamrakov |
| 2002/0198806 A1 | 12/2002 | Blagg et al. |
| 2002/0198824 A1 | 12/2002 | Cook |
| 2003/0002671 A1 | 1/2003 | Inchalik et al. |
| 2003/0009418 A1 | 1/2003 | Green et al. |
| 2003/0009426 A1 | 1/2003 | Ruiz-Sanchez |
| 2003/0023531 A1 | 1/2003 | Fergusson |
| 2003/0046311 A1 | 3/2003 | Baidya et al. |
| 2003/0061163 A1 | 3/2003 | Durfield |
| 2003/0069839 A1 | 4/2003 | Whittington et al. |
| 2003/0069943 A1 | 4/2003 | Bahrs et al. |
| 2003/0097342 A1 | 5/2003 | Whittingtom |
| 2003/0097380 A1 | 5/2003 | Mulhern et al. |
| 2003/0105733 A1 | 6/2003 | Boreham |
| 2003/0105742 A1 | 6/2003 | Boreham et al. |
| 2003/0115133 A1 | 6/2003 | Bian |
| 2003/0158960 A1 | 8/2003 | Engberg |
| 2003/0163513 A1 | 8/2003 | Schaeck et al. |
| 2003/0163733 A1 | 8/2003 | Barriga-Caceres et al. |
| 2003/0171942 A1 | 9/2003 | Gaito |
| 2003/0177028 A1 | 9/2003 | Cooper et al. |
| 2003/0182214 A1 | 9/2003 | Taylor |
| 2003/0187837 A1 | 10/2003 | Culliss |
| 2003/0195859 A1 | 10/2003 | Lawrence |
| 2003/0204429 A1 | 10/2003 | Botscheck et al. |
| 2003/0204752 A1 | 10/2003 | Garrison |
| 2003/0220858 A1 | 11/2003 | Lam et al. |
| 2004/0006488 A1 | 1/2004 | Fitall et al. |
| 2004/0010458 A1 | 1/2004 | Friedman |
| 2004/0015714 A1 | 1/2004 | Abraham et al. |
| 2004/0015715 A1 | 1/2004 | Brown |
| 2004/0019518 A1 | 1/2004 | Abraham et al. |
| 2004/0019799 A1 | 1/2004 | Vering et al. |
| 2004/0024709 A1 | 2/2004 | Yu et al. |
| 2004/0030649 A1 | 2/2004 | Nelson et al. |
| 2004/0039586 A1 | 2/2004 | Garvey et al. |
| 2004/0044628 A1 | 3/2004 | Mathew et al. |
| 2004/0044673 A1 | 3/2004 | Brady et al. |
| 2004/0044739 A1 | 3/2004 | Ziegler |
| 2004/0078323 A1 | 4/2004 | Johnston et al. |
| 2004/0078324 A1 | 4/2004 | Lonnberg et al. |
| 2004/0088237 A1 | 5/2004 | Moenickheim et al. |
| 2004/0088255 A1 | 5/2004 | Zielke et al. |
| 2004/0107250 A1 | 6/2004 | Marciano |
| 2004/0110119 A1 | 6/2004 | Riconda et al. |
| 2004/0111359 A1 | 6/2004 | Hudock |
| 2004/0117302 A1 | 6/2004 | Weichert et al. |
| 2004/0122681 A1 | 6/2004 | Ruvolo et al. |
| 2004/0122696 A1 | 6/2004 | Beringer |
| 2004/0123162 A1 | 6/2004 | Antell et al. |
| 2004/0128150 A1 | 7/2004 | Lundegren |
| 2004/0128156 A1 | 7/2004 | Beringer et al. |
| 2004/0133440 A1 | 7/2004 | Carolan et al. |
| 2004/0133509 A1 | 7/2004 | McCoy et al. |
| 2004/0133513 A1 | 7/2004 | McCoy et al. |
| 2004/0133515 A1 | 7/2004 | McCoy et al. |
| 2004/0138994 A1 | 7/2004 | DeFrancesco et al. |
| 2004/0141005 A1 | 7/2004 | Banatwala et al. |
| 2004/0143546 A1 | 7/2004 | Wood et al. |
| 2004/0143596 A1 | 7/2004 | Sirkin |
| 2004/0153521 A1 | 8/2004 | Kogo |
| 2004/0158523 A1 | 8/2004 | Dort |
| 2004/0158723 A1 | 8/2004 | Root |
| 2004/0159700 A1 | 8/2004 | Khan et al. |
| 2004/0167793 A1 | 8/2004 | Masuoka et al. |
| 2004/0193891 A1 | 9/2004 | Ollila |
| 2004/0199789 A1 | 10/2004 | Shaw et al. |
| 2004/0210661 A1 | 10/2004 | Thompson |
| 2004/0220865 A1 | 11/2004 | Lozowski et al. |
| 2004/0220918 A1 | 11/2004 | Scriffignano et al. |
| 2004/0225643 A1 | 11/2004 | Alpha et al. |
| 2004/0230527 A1 | 11/2004 | Hansen et al. |
| 2004/0230534 A1 | 11/2004 | McGough |
| 2004/0243518 A1 | 12/2004 | Clifton et al. |
| 2004/0243588 A1 | 12/2004 | Tanner et al. |
| 2004/0243832 A1 | 12/2004 | Wilf et al. |
| 2004/0249811 A1 | 12/2004 | Shostack |
| 2004/0250107 A1 | 12/2004 | Guo |
| 2004/0254935 A1 | 12/2004 | Chagoly et al. |
| 2004/0255127 A1 | 12/2004 | Arnouse |
| 2004/0267714 A1 | 12/2004 | Frid et al. |
| 2005/0005168 A1 | 1/2005 | Dick |
| 2005/0010513 A1 | 1/2005 | Duckworth et al. |
| 2005/0021476 A1 | 1/2005 | Candella et al. |
| 2005/0021551 A1 | 1/2005 | Silva et al. |
| 2005/0027983 A1 | 2/2005 | Klawon |
| 2005/0027995 A1 | 2/2005 | Menschik et al. |
| 2005/0055231 A1 | 3/2005 | Lee |
| 2005/0058262 A1 | 3/2005 | Timmins et al. |
| 2005/0060332 A1 | 3/2005 | Bernstein et al. |
| 2005/0071328 A1 | 3/2005 | Lawrence |
| 2005/0086126 A1 | 4/2005 | Patterson |
| 2005/0091164 A1 | 4/2005 | Varble |
| 2005/0097017 A1 | 5/2005 | Hanratty |
| 2005/0097039 A1 | 5/2005 | Kulcsar et al. |
| 2005/0097320 A1 | 5/2005 | Golan et al. |
| 2005/0102180 A1 | 5/2005 | Gailey et al. |
| 2005/0105719 A1 | 5/2005 | Hada |
| 2005/0108396 A1 | 5/2005 | Bittner |
| 2005/0108631 A1 | 5/2005 | Amorin et al. |
| 2005/0114335 A1 | 5/2005 | Wesinger, Jr. et al. |
| 2005/0114344 A1 | 5/2005 | Wesinger, Jr. et al. |
| 2005/0114345 A1 | 5/2005 | Wesinger, Jr. et al. |
| 2005/0125291 A1 | 6/2005 | Demkiw Grayson et al. |
| 2005/0125397 A1 | 6/2005 | Gross et al. |
| 2005/0125686 A1 | 6/2005 | Brandt |
| 2005/0137899 A1 | 6/2005 | Davies et al. |
| 2005/0144452 A1 | 6/2005 | Lynch et al. |
| 2005/0154664 A1 | 7/2005 | Guy et al. |
| 2005/0154665 A1 | 7/2005 | Kerr |
| 2005/0154769 A1 | 7/2005 | Eckart et al. |
| 2005/0166262 A1 | 7/2005 | Beattie et al. |
| 2005/0208461 A1 | 9/2005 | Krebs et al. |
| 2005/0216434 A1 | 9/2005 | Haveliwala et al. |
| 2005/0216582 A1 | 9/2005 | Toomey et al. |
| 2005/0216955 A1 | 9/2005 | Wilkins et al. |
| 2005/0226224 A1 | 10/2005 | Lee et al. |
| 2005/0240578 A1 | 10/2005 | Biederman et al. |
| 2005/0256809 A1 | 11/2005 | Sadri |
| 2005/0267840 A1 | 12/2005 | Holm-Blagg et al. |
| 2005/0273431 A1 | 12/2005 | Abel et al. |
| 2005/0273442 A1 | 12/2005 | Bennett et al. |
| 2005/0279827 A1 | 12/2005 | Mascavage et al. |
| 2005/0288998 A1 | 12/2005 | Verma et al. |
| 2006/0004623 A1 | 1/2006 | Jasti |
| 2006/0004626 A1 | 1/2006 | Holmen et al. |
| 2006/0010391 A1 | 1/2006 | Uemura et al. |
| 2006/0010487 A1 | 1/2006 | Fierer et al. |
| 2006/0032909 A1 | 2/2006 | Seegar |
| 2006/0036543 A1 | 2/2006 | Blagg et al. |
| 2006/0036748 A1 | 2/2006 | Nusbaum et al. |
| 2006/0036870 A1 | 2/2006 | Dasari et al. |
| 2006/0041464 A1 | 2/2006 | Powers et al. |
| 2006/0041670 A1 | 2/2006 | Musseleck et al. |
| 2006/0059110 A1 | 3/2006 | Madhok et al. |
| 2006/0059362 A1 | 3/2006 | Paden et al. |
| 2006/0074986 A1 | 4/2006 | Mallalieu et al. |
| 2006/0074991 A1 | 4/2006 | Lussier et al. |
| 2006/0079211 A1 | 4/2006 | Degraeve |
| 2006/0080230 A1 | 4/2006 | Freiberg |
| 2006/0080251 A1 | 4/2006 | Fried et al. |
| 2006/0080263 A1 | 4/2006 | Willis et al. |
| 2006/0085361 A1 | 4/2006 | Hoerle et al. |
| 2006/0101508 A1 | 5/2006 | Taylor |
| 2006/0129419 A1 | 6/2006 | Flaxer et al. |
| 2006/0129481 A1 | 6/2006 | Bhatt et al. |
| 2006/0129533 A1 | 6/2006 | Purvis |
| 2006/0131390 A1 | 6/2006 | Kim |
| 2006/0136595 A1 | 6/2006 | Satyavolu |
| 2006/0155573 A1 | 7/2006 | Hartunian |
| 2006/0155780 A1 | 7/2006 | Sakairi et al. |
| 2006/0161435 A1 | 7/2006 | Atef et al. |

(56) References Cited

U.S. PATENT DOCUMENTS

| | | |
|---|---|---|
| 2006/0161554 A1 | 7/2006 | Lucovsky et al. |
| 2006/0173776 A1 | 8/2006 | Shalley et al. |
| 2006/0173792 A1 | 8/2006 | Glass |
| 2006/0178971 A1 | 8/2006 | Owen et al. |
| 2006/0179050 A1 | 8/2006 | Giang et al. |
| 2006/0184585 A1 | 8/2006 | Grear et al. |
| 2006/0195351 A1 | 8/2006 | Bayburtian |
| 2006/0200396 A1 | 9/2006 | Satterfield et al. |
| 2006/0204051 A1 | 9/2006 | Holland, IV |
| 2006/0212407 A1 | 9/2006 | Lyon |
| 2006/0218407 A1 | 9/2006 | Toms |
| 2006/0229943 A1 | 10/2006 | Mathias et al. |
| 2006/0229961 A1 | 10/2006 | Lyftogt et al. |
| 2006/0235935 A1 | 10/2006 | Ng |
| 2006/0239512 A1 | 10/2006 | Petrillo |
| 2006/0253358 A1 | 11/2006 | Delgrosso et al. |
| 2006/0262929 A1 | 11/2006 | Vatanen et al. |
| 2006/0265243 A1 | 11/2006 | Racho et al. |
| 2006/0271456 A1 | 11/2006 | Romain et al. |
| 2006/0271457 A1 | 11/2006 | Romain et al. |
| 2006/0271633 A1 | 11/2006 | Adler |
| 2006/0277089 A1 | 12/2006 | Hubbard et al. |
| 2006/0282429 A1 | 12/2006 | Hernandez-Sherrington et al. |
| 2006/0282819 A1 | 12/2006 | Graham et al. |
| 2006/0287764 A1 | 12/2006 | Kraft |
| 2006/0287765 A1 | 12/2006 | Kraft |
| 2006/0287766 A1 | 12/2006 | Kraft |
| 2006/0287767 A1 | 12/2006 | Kraft |
| 2006/0288090 A1 | 12/2006 | Kraft |
| 2006/0294199 A1 | 12/2006 | Bertholf |
| 2007/0005508 A1 | 1/2007 | Chiang |
| 2007/0005984 A1 | 1/2007 | Florencio et al. |
| 2007/0022141 A1 | 1/2007 | Singleton et al. |
| 2007/0027816 A1 | 2/2007 | Writer |
| 2007/0032240 A1 | 2/2007 | Finnegan et al. |
| 2007/0038568 A1 | 2/2007 | Greene et al. |
| 2007/0043577 A1 | 2/2007 | Kasower |
| 2007/0047714 A1 | 3/2007 | Baniak et al. |
| 2007/0067297 A1 | 3/2007 | Kublickis |
| 2007/0072190 A1 | 3/2007 | Aggarwal |
| 2007/0073889 A1 | 3/2007 | Morris |
| 2007/0078908 A1 | 4/2007 | Rohatgi et al. |
| 2007/0078985 A1 | 4/2007 | Shao et al. |
| 2007/0083460 A1 | 4/2007 | Bachenheimer |
| 2007/0083463 A1 | 4/2007 | Kraft |
| 2007/0093234 A1 | 4/2007 | Willis et al. |
| 2007/0094230 A1 | 4/2007 | Subramaniam et al. |
| 2007/0094241 A1 | 4/2007 | M. Blackwell et al. |
| 2007/0112667 A1 | 5/2007 | Rucker |
| 2007/0112668 A1 | 5/2007 | Celano et al. |
| 2007/0121843 A1 | 5/2007 | Atazky et al. |
| 2007/0124256 A1 | 5/2007 | Crooks et al. |
| 2007/0156692 A1 | 7/2007 | Rosewarne |
| 2007/0174186 A1 | 7/2007 | Hokland |
| 2007/0174448 A1 | 7/2007 | Ahuja et al. |
| 2007/0174903 A1 | 7/2007 | Greff |
| 2007/0204338 A1 | 8/2007 | Aiello et al. |
| 2007/0205266 A1 | 9/2007 | Carr et al. |
| 2007/0240206 A1 | 10/2007 | Wu et al. |
| 2007/0244807 A1 | 10/2007 | Andringa et al. |
| 2007/0245245 A1 | 10/2007 | Blue et al. |
| 2007/0250441 A1 | 10/2007 | Paulsen et al. |
| 2007/0250459 A1 | 10/2007 | Schwarz et al. |
| 2007/0261114 A1 | 11/2007 | Pomerantsev |
| 2007/0266439 A1 | 11/2007 | Kraft |
| 2007/0282743 A1 | 12/2007 | Lovelett |
| 2007/0288355 A1 | 12/2007 | Roland et al. |
| 2007/0288360 A1 | 12/2007 | Seeklus |
| 2007/0294195 A1 | 12/2007 | Curry et al. |
| 2008/0010203 A1 | 1/2008 | Grant |
| 2008/0010206 A1 | 1/2008 | Coleman |
| 2008/0010687 A1 | 1/2008 | Gonen et al. |
| 2008/0028446 A1 | 1/2008 | Burgoyne |
| 2008/0033742 A1 | 2/2008 | Bernasconi |
| 2008/0033956 A1 | 2/2008 | Saha et al. |
| 2008/0047017 A1 | 2/2008 | Renaud |
| 2008/0052182 A1 | 2/2008 | Marshall |
| 2008/0052244 A1 | 2/2008 | Tsuei et al. |
| 2008/0059364 A1 | 3/2008 | Tidwell et al. |
| 2008/0066188 A1 | 3/2008 | Kwak |
| 2008/0071682 A1 | 3/2008 | Dominguez |
| 2008/0072316 A1 | 3/2008 | Chang et al. |
| 2008/0077526 A1 | 3/2008 | Arumugam |
| 2008/0082536 A1 | 4/2008 | Schwabe et al. |
| 2008/0083021 A1 | 4/2008 | Doane et al. |
| 2008/0086431 A1 | 4/2008 | Robinson et al. |
| 2008/0086759 A1 | 4/2008 | Colson |
| 2008/0103800 A1 | 5/2008 | Domenikos et al. |
| 2008/0103972 A1 | 5/2008 | Lanc |
| 2008/0109422 A1 | 5/2008 | Dedhia |
| 2008/0109875 A1 | 5/2008 | Kraft |
| 2008/0114670 A1 | 5/2008 | Friesen |
| 2008/0115191 A1 | 5/2008 | Kim et al. |
| 2008/0115226 A1 | 5/2008 | Welingkar et al. |
| 2008/0120569 A1 | 5/2008 | Mann et al. |
| 2008/0120716 A1 | 5/2008 | Hall et al. |
| 2008/0126233 A1 | 5/2008 | Hogan |
| 2008/0141346 A1 | 6/2008 | Kay et al. |
| 2008/0148368 A1 | 6/2008 | Zurko et al. |
| 2008/0154758 A1 | 6/2008 | Schattmaier et al. |
| 2008/0162317 A1 | 7/2008 | Banaugh et al. |
| 2008/0162350 A1 | 7/2008 | Allen-Rouman et al. |
| 2008/0162383 A1 | 7/2008 | Kraft |
| 2008/0175360 A1 | 7/2008 | Schwarz et al. |
| 2008/0183480 A1 | 7/2008 | Carlson et al. |
| 2008/0183585 A1 | 7/2008 | Vianello |
| 2008/0195548 A1 | 8/2008 | Chu et al. |
| 2008/0201401 A1 | 8/2008 | Pugh et al. |
| 2008/0205655 A1 | 8/2008 | Wilkins et al. |
| 2008/0208735 A1 | 8/2008 | Balet et al. |
| 2008/0208873 A1 | 8/2008 | Boehmer |
| 2008/0222706 A1 | 9/2008 | Renaud et al. |
| 2008/0229415 A1 | 9/2008 | Kapoor et al. |
| 2008/0249869 A1 | 10/2008 | Angell et al. |
| 2008/0255992 A1 | 10/2008 | Lin |
| 2008/0263058 A1 | 10/2008 | Peden |
| 2008/0270295 A1 | 10/2008 | Lent et al. |
| 2008/0281737 A1 | 11/2008 | Fajardo |
| 2008/0288283 A1 | 11/2008 | Baldwin, Jr. et al. |
| 2008/0288299 A1 | 11/2008 | Schultz |
| 2008/0301016 A1 | 12/2008 | Durvasula et al. |
| 2008/0306750 A1 | 12/2008 | Wunder et al. |
| 2008/0319889 A1 | 12/2008 | Hammad |
| 2009/0006230 A1 | 1/2009 | Lyda et al. |
| 2009/0031426 A1 | 1/2009 | Dal Lago et al. |
| 2009/0037332 A1 | 2/2009 | Cheung et al. |
| 2009/0043691 A1 | 2/2009 | Kasower |
| 2009/0055322 A1 | 2/2009 | Bykov et al. |
| 2009/0055894 A1 | 2/2009 | Lorsch |
| 2009/0060343 A1 | 3/2009 | Rosca |
| 2009/0064297 A1 | 3/2009 | Selgas et al. |
| 2009/0094237 A1 | 4/2009 | Churi et al. |
| 2009/0094674 A1 | 4/2009 | Schwartz et al. |
| 2009/0100047 A1 | 4/2009 | Jones et al. |
| 2009/0106141 A1 | 4/2009 | Becker |
| 2009/0106150 A1 | 4/2009 | Pelegero et al. |
| 2009/0106846 A1 | 4/2009 | Dupray et al. |
| 2009/0119299 A1 | 5/2009 | Rhodes |
| 2009/0125369 A1 | 5/2009 | Kloostra et al. |
| 2009/0125972 A1 | 5/2009 | Hinton et al. |
| 2009/0126013 A1 | 5/2009 | Atwood et al. |
| 2009/0138335 A1 | 5/2009 | Lieberman |
| 2009/0144166 A1 | 6/2009 | Dickelman |
| 2009/0150166 A1 | 6/2009 | Leite et al. |
| 2009/0150238 A1 | 6/2009 | Marsh et al. |
| 2009/0157693 A1 | 6/2009 | Palahnuk |
| 2009/0158030 A1 | 6/2009 | Rasti |
| 2009/0164232 A1 | 6/2009 | Chmielewski et al. |
| 2009/0164380 A1 | 6/2009 | Brown |
| 2009/0172788 A1 | 7/2009 | Vedula et al. |
| 2009/0172795 A1 | 7/2009 | Ritari et al. |
| 2009/0177529 A1 | 7/2009 | Hadi |
| 2009/0177562 A1 | 7/2009 | Peace et al. |
| 2009/0183259 A1 | 7/2009 | Rinek et al. |

(56) References Cited

U.S. PATENT DOCUMENTS

| | | |
|---|---|---|
| 2009/0199264 A1 | 8/2009 | Lang |
| 2009/0199294 A1 | 8/2009 | Schneider |
| 2009/0204514 A1 | 8/2009 | Bhogal et al. |
| 2009/0204599 A1 | 8/2009 | Morris et al. |
| 2009/0210241 A1 | 8/2009 | Calloway |
| 2009/0210807 A1 | 8/2009 | Xiao et al. |
| 2009/0216640 A1 | 8/2009 | Masi |
| 2009/0228918 A1 | 9/2009 | Rolff et al. |
| 2009/0234665 A1 | 9/2009 | Conkel |
| 2009/0234775 A1 | 9/2009 | Whitney et al. |
| 2009/0234876 A1 | 9/2009 | Schigel et al. |
| 2009/0240624 A1 | 9/2009 | James et al. |
| 2009/0247122 A1 | 10/2009 | Fitzgerald et al. |
| 2009/0254375 A1 | 10/2009 | Martinez et al. |
| 2009/0254476 A1 | 10/2009 | Sharma et al. |
| 2009/0254656 A1 | 10/2009 | Vignisson et al. |
| 2009/0254971 A1 | 10/2009 | Herz et al. |
| 2009/0260064 A1 | 10/2009 | Mcdowell et al. |
| 2009/0271248 A1 | 10/2009 | Sherman et al. |
| 2009/0307778 A1 | 12/2009 | Mardikar |
| 2009/0313562 A1 | 12/2009 | Appleyard et al. |
| 2009/0327270 A1 | 12/2009 | Teevan et al. |
| 2009/0328173 A1 | 12/2009 | Jakobson et al. |
| 2010/0011428 A1 | 1/2010 | Atwood et al. |
| 2010/0030578 A1 | 2/2010 | Siddique et al. |
| 2010/0030677 A1 | 2/2010 | Melik-Aslanian et al. |
| 2010/0043055 A1 | 2/2010 | Baumgart |
| 2010/0049803 A1 | 2/2010 | Ogilvie et al. |
| 2010/0063993 A1 | 3/2010 | Higgins et al. |
| 2010/0077483 A1 | 3/2010 | Stolfo et al. |
| 2010/0083371 A1 | 4/2010 | Bennetts et al. |
| 2010/0094768 A1 | 4/2010 | Miltonberger |
| 2010/0094910 A1 | 4/2010 | Bayliss |
| 2010/0100945 A1 | 4/2010 | Ozzie et al. |
| 2010/0114724 A1 | 5/2010 | Ghosh et al. |
| 2010/0114744 A1 | 5/2010 | Gonen |
| 2010/0114776 A1 | 5/2010 | Weller et al. |
| 2010/0121767 A1 | 5/2010 | Coulter et al. |
| 2010/0122324 A1 | 5/2010 | Welingkar et al. |
| 2010/0122333 A1 | 5/2010 | Noe et al. |
| 2010/0130172 A1 | 5/2010 | Vendrow et al. |
| 2010/0136956 A1 | 6/2010 | Drachev et al. |
| 2010/0145836 A1 | 6/2010 | Baker et al. |
| 2010/0145840 A1 | 6/2010 | Kasower |
| 2010/0153278 A1 | 6/2010 | Farsedakis |
| 2010/0153290 A1 | 6/2010 | Duggan |
| 2010/0161816 A1 | 6/2010 | Kraft et al. |
| 2010/0169159 A1 | 7/2010 | Rose et al. |
| 2010/0174638 A1 | 7/2010 | Debie et al. |
| 2010/0174813 A1 | 7/2010 | Hildreth et al. |
| 2010/0179906 A1 | 7/2010 | Hawkes |
| 2010/0185546 A1 | 7/2010 | Pollard |
| 2010/0205076 A1 | 8/2010 | Parson et al. |
| 2010/0205662 A1 | 8/2010 | Ibrahim et al. |
| 2010/0211636 A1 | 8/2010 | Starkenburg et al. |
| 2010/0217837 A1 | 8/2010 | Ansari et al. |
| 2010/0223192 A1 | 9/2010 | Levine et al. |
| 2010/0229245 A1 | 9/2010 | Singhal |
| 2010/0241535 A1 | 9/2010 | Nightengale et al. |
| 2010/0250338 A1 | 9/2010 | Banerjee et al. |
| 2010/0250410 A1 | 9/2010 | Song et al. |
| 2010/0250411 A1 | 9/2010 | Ogrodski |
| 2010/0250497 A1 | 9/2010 | Redlich et al. |
| 2010/0257102 A1 | 10/2010 | Perlman |
| 2010/0262932 A1 | 10/2010 | Pan |
| 2010/0280914 A1 | 11/2010 | Carlson |
| 2010/0281020 A1 | 11/2010 | Drubner |
| 2010/0299262 A1 | 11/2010 | Handler |
| 2010/0325694 A1 | 12/2010 | Bhagavatula et al. |
| 2010/0332393 A1 | 12/2010 | Weller et al. |
| 2011/0004498 A1 | 1/2011 | Readshaw |
| 2011/0016533 A1 | 1/2011 | Zeigler et al. |
| 2011/0023115 A1 | 1/2011 | Wright |
| 2011/0029388 A1 | 2/2011 | Kendall et al. |
| 2011/0035788 A1 | 2/2011 | White et al. |
| 2011/0071950 A1 | 3/2011 | Ivanovic |
| 2011/0083181 A1 | 4/2011 | Nazarov |
| 2011/0113084 A1 | 5/2011 | Ramnani |
| 2011/0126275 A1 | 5/2011 | Anderson et al. |
| 2011/0131123 A1* | 6/2011 | Griffin et al. .................. 705/35 |
| 2011/0137760 A1 | 6/2011 | Rudie et al. |
| 2011/0142213 A1 | 6/2011 | Baniak et al. |
| 2011/0145899 A1 | 6/2011 | Cao et al. |
| 2011/0148625 A1 | 6/2011 | Velusamy |
| 2011/0161218 A1 | 6/2011 | Swift |
| 2011/0166988 A1 | 7/2011 | Coulter |
| 2011/0167011 A1 | 7/2011 | Paltenghe et al. |
| 2011/0179139 A1 | 7/2011 | Starkenburg et al. |
| 2011/0184780 A1 | 7/2011 | Alderson et al. |
| 2011/0184838 A1 | 7/2011 | Winters et al. |
| 2011/0196791 A1 | 8/2011 | Dominguez |
| 2011/0264566 A1 | 10/2011 | Brown |
| 2011/0307397 A1 | 12/2011 | Benmbarek |
| 2011/0307957 A1 | 12/2011 | Barcelo et al. |
| 2012/0011158 A1 | 1/2012 | Avner et al. |
| 2012/0016948 A1 | 1/2012 | Sinha |
| 2012/0017266 A1 | 1/2012 | DiChiara et al. |
| 2012/0030216 A1 | 2/2012 | Churi et al. |
| 2012/0030771 A1 | 2/2012 | Pierson et al. |
| 2012/0047219 A1 | 2/2012 | Feng et al. |
| 2012/0054592 A1 | 3/2012 | Jaffe et al. |
| 2012/0072382 A1 | 3/2012 | Pearson et al. |
| 2012/0078932 A1 | 3/2012 | Skurtovich, Jr. et al. |
| 2012/0084866 A1 | 4/2012 | Stolfo |
| 2012/0108274 A1 | 5/2012 | Acebo Ruiz et al. |
| 2012/0110467 A1 | 5/2012 | Blake et al. |
| 2012/0110677 A1 | 5/2012 | Abendroth et al. |
| 2012/0124498 A1 | 5/2012 | Santoro et al. |
| 2012/0136763 A1 | 5/2012 | Megdal et al. |
| 2012/0151045 A1 | 6/2012 | Anakata et al. |
| 2012/0158574 A1 | 6/2012 | Brunzell et al. |
| 2012/0173339 A1 | 7/2012 | Flynt et al. |
| 2012/0215682 A1 | 8/2012 | Lent et al. |
| 2012/0216125 A1 | 8/2012 | Pierce |
| 2012/0235897 A1 | 9/2012 | Hirota |
| 2012/0239497 A1 | 9/2012 | Nuzzi |
| 2012/0246060 A1 | 9/2012 | Conyack, Jr. et al. |
| 2012/0253852 A1 | 10/2012 | Pourfallah et al. |
| 2012/0265607 A1 | 10/2012 | Belwadi |
| 2012/0290660 A1 | 11/2012 | Rao et al. |
| 2012/0297484 A1 | 11/2012 | Srivastava |
| 2013/0018811 A1 | 1/2013 | Britti et al. |
| 2013/0031109 A1 | 1/2013 | Routson et al. |
| 2013/0031624 A1 | 1/2013 | Britti et al. |
| 2013/0066775 A1 | 3/2013 | Milam |
| 2013/0080467 A1 | 3/2013 | Carson et al. |
| 2013/0085804 A1 | 4/2013 | Leff et al. |
| 2013/0110678 A1 | 5/2013 | Vigier et al. |
| 2013/0117087 A1 | 5/2013 | Coppinger |
| 2013/0124392 A1 | 5/2013 | Achanta et al. |
| 2013/0125010 A1 | 5/2013 | Strandell |
| 2013/0132151 A1 | 5/2013 | Stibel et al. |
| 2013/0173449 A1 | 7/2013 | Ng et al. |
| 2013/0205135 A1 | 8/2013 | Lutz |
| 2013/0211986 A1 | 8/2013 | Debie et al. |
| 2013/0246528 A1 | 9/2013 | Ogura |
| 2013/0279676 A1 | 10/2013 | Baniak et al. |
| 2013/0298238 A1 | 11/2013 | Shah et al. |
| 2013/0332342 A1 | 12/2013 | Kasower |
| 2013/0339249 A1 | 12/2013 | Weller et al. |
| 2014/0012733 A1 | 1/2014 | Vidal |
| 2014/0032723 A1 | 1/2014 | Nema |
| 2014/0061302 A1 | 3/2014 | Hammad |
| 2014/0089167 A1 | 3/2014 | Kasower |
| 2014/0110477 A1 | 4/2014 | Hammad |
| 2014/0164398 A1 | 6/2014 | Smith et al. |
| 2014/0164519 A1 | 6/2014 | Shah |
| 2014/0298485 A1 | 10/2014 | Gardner |
| 2015/0326580 A1 | 11/2015 | McMillan et al. |

FOREIGN PATENT DOCUMENTS

| | | |
|---|---|---|
| EP | 1 301 887 | 4/2003 |
| EP | 1 850 278 | 10/2007 |

(56) References Cited

FOREIGN PATENT DOCUMENTS

| | | |
|---|---|---|
| JP | 2005-208945 | 8/2005 |
| KR | 2000-0063313 | 11/2000 |
| KR | 2002-0039203 | 5/2002 |
| KR | 10-2004-0078798 | 9/2004 |
| KR | 10-2007-0081504 | 8/2007 |
| WO | WO 99/60481 | 11/1999 |
| WO | WO 00/30045 | 5/2000 |
| WO | WO 01/09752 | 2/2001 |
| WO | WO 01/09792 | 2/2001 |
| WO | WO 01/84281 | 11/2001 |
| WO | WO 02/29636 | 4/2002 |
| WO | WO 2004/031986 | 4/2004 |
| WO | WO 2005/033979 | 4/2005 |
| WO | WO 2006/050278 | 5/2006 |
| WO | WO 2006/069199 | 6/2006 |
| WO | WO 2008/042614 | 4/2008 |
| WO | WO 2009/064694 | 5/2009 |
| WO | WO 2009/102391 | 8/2009 |
| WO | WO 2009/117468 | 9/2009 |
| WO | WO 2010/001406 | 1/2010 |
| WO | WO 2010/062537 | 6/2010 |
| WO | WO 2010/077989 | 7/2010 |
| WO | WO 2010/150251 | 12/2010 |
| WO | WO 2011/005876 | 1/2011 |
| WO | WO 2013/009920 | 1/2013 |

OTHER PUBLICATIONS

Rethinking Regulation of Credit Rating Agencies: An institutional investor perspective. Frank Partnoy. Apr. 2009.*
Access to Fair Credit Reports: Current Practices and Proposed Legislation. Joseph Fisher. American Business Law Journal. Fall 1981.*
U.S. Appl. No. 12/705,489, filed Dec. 12, 2010, Bargoli et al.
U.S. Appl. No. 12/705,511, filed Feb. 12, 2010, Bargoli et al.
Chores & Allowances. "Do Kids Have Credit Reports?" Oct. 15, 2007, http://choresandallowances.blogspot.com/2007/10/do-kids-have-credit-reports.html, pp. 5.
"Consumers Gain Immediate and Full Access to Credit Score Used by Majority of U.S. Lenders." PR Newswire, ProQuest Copy; Mar. 19, 2001, p. 1.
Ettorre, Paul Kahn on Exceptional Marketing, Management Review, vol. 38(11), Nov. 1994, pp. 48-51.
Expensr.com http://www.expensr.com/, as retrieved on Sep. 17, 2008.
Gibbs, Adrienne; "Protecting Your Children from Identity Theft," Nov. 25, 2008, http://www.creditcards.com/credit-card-news/identity-ID-theft-and-kids-children-1282.php, pp. 4.
Hoofnagle, Chris Jay, "Identity Theft: Making the Known Unknowns Known," Harvard Journal of Law & Technology, Fall 2007, vol. 21, No. 1, pp. 98-122.
ID Analytics, "ID Analytics® Consumer Notification Service" printed Apr. 16, 2013 in 2 pages.
ID Theft Assist, "Do You Know Where Your Child's Credit Is?", Nov. 26, 2007, http://www.idtheftassist.com/pages/story14, pp. 3.
Ideon, Credit-Card Registry that Bellyflopped this Year, Is Drawing some Bottom-Fishers, The Wall Street Journal, Aug. 21, 1995, pp. C2.
Lee, W.A.; "Experian, on Deal Hunt, Nets Identity Theft Insurer", American Banker: The Financial Services Daily, Jun. 4, 2003, New York, NY, 1 page.
Li et al., "Automatic Verbal Information Verification for User Authentication", IEEE Transactions on Speech and Audio Processing, vol. 8, No. 5, Sep. 2000, pp. 585-596.
LifeLock, "How LifeLock Works," http://www.lifelock.com/lifelock-for-people printed Mar. 14, 2008 in 1 page.
LifeLock, "LifeLock Launches First ID Theft Prevention Program for the Protection of Children," Press Release, Oct. 14, 2005, http://www.lifelock.com/about-us/press-room/2005-press-releases/lifelock-protection-for-children.
LifeLock; "How Can LifeLock Protect My Kids and Family?" http://www.lifelock.com/lifelock-for-people/how-we-do-it/how-can-lifelock-protect-my-kids-and-family printed Mar. 14, 2008 in 1 page.
LifeLock, Various Pages, www.lifelock.com/, 2007.
Magid, Lawrence, J., Business Tools: When Selecting an ASP Ensure Data Mobility, Los Angeles Times, Los Angeles, CA, Feb. 26, 2001, vol. C, Issue 4, pp. 3.
My ID Alerts, "Why ID Alerts" http://www.myidalerts.com/why-id-alerts.jsps printed Apr. 3, 2012 in 2 pages.
My ID Alerts, "How it Works" http://www.myidalerts.com/how-it-works.jsps printed Apr. 3, 2012 in 3 pages.
Pagano, et al., "Information Sharing in Credit Markets," Dec. 1993, The Journal of Finance, vol. 48, No. 5, pp. 1693-1718.
Privacy Rights Clearinghouse, "Identity Theft: What to do if it Happens to You," http://web.archive.org/web/19990218180542/http://privacyrights.org/fs/fs17a.htm printed Feb. 18, 1999.
Ramaswamy, Vinita M., Identity-Theft Toolkit, The CPA Journal, Oct. 1, 2006, vol. 76, Issue 10, pp. 66-70.
Rawe, Julie; "Identity Thieves", Time Bonus Section, Inside Business, Feb. 2002, pp. 2.
Truston, "Checking if your Child is an ID Theft Victim can be Stressful," as posted by Michelle Pastor on Jan. 22, 2007 at http://www.mytruston.com/blog/credit/checking_if_your_child_is_an_id_theft_vi.html.
Vamosi, Robert, "How to Handle ID Fraud's Youngest Victims," Nov. 21, 2008, http://news.cnet.com/8301-10789_3-10105303-57.html.
Waggoner, Darren J., "Having a Global Identity Crisis," Collections & Credit Risk, Aug. 2001, vol. vol. 6, No. 8, pp. 6.
International Search Report and Written Opinion for Application No. PCT/US2012/046316, dated Sep. 28, 2012.
International Preliminary Report on Patentability and Written Opinion for Application No. PCT/US2012/046316, dated Jan. 14, 2014.
Harrington et al., "iOS 4 in Action", Chapter 17, Local and Push Notification Services, Manning Publications Co., Jun. 2011, pp. 347-353.
Actuate, "Delivering Enterprise Information for Corporate Portals", White Paper, 2004, pp. 1-7.
"Aggregate and Analyze Social Media Content: Gain Faster and Broader Insight to Market Sentiment," SAP Partner, Mantis Technology Group, Apr. 2011, pp. 4.
Aharony et al., "Social Area Networks: Data Networking of the People, by the People, for the People," 2009 International Conference on Computational Science and Engineering, May 2009, pp. 1148-1155.
Aktas et al., "Personalizing PageRank Based on Domain Profiles", WEBKDD workshop: Webmining and Web Usage Analysis, Aug. 22, 2004, pp. 83-90.
Aktas et al., "Using Hyperlink Features to Personalize Web Search", WEBKDD workshop: Webmining and Web Usage Analysis, Aug. 2004.
"Arizona Company Has Found Key in Stopping ID Theft," PR Newswire, New York, Aug. 10, 2005 http://proquest.umi.com/pqdweb?did=880104711&sid=1&Fmt=3&clientId=1964981RQT=309&Vname=PQD.
ABC News Now:Money Matters, as broadcasted Nov. 15, 2005 with guest Todd Davis (CEO of Lifelock), pp. 6.
Anonymous, "Credit-Report Disputes Await Electronic Resolution," Credit Card News, Chicago, Jan. 15, 1993, vol. 5, No. 19, p. 5.
Anonymous, "MBNA Offers Resolution of Credit Card Disputes," Hempstead, Feb. 2002, vol. 68, No. 2, p. 47.
Anonymous, "Feedback", Credit Management, ABI/INFORM Global, Sep. 2006, pp. 6.
Bielski, Lauren, "Will you Spend to Thwart ID Theft?" ABA Banking Journal, Apr. 2005, pp. 54, 56-57, 60.
BlueCava, "What We Do", http://www.bluecava.com/what-we-do/, printed Nov. 5, 2012 in 3 pages.
Buxfer, http://www.buxfer.com/ printed Feb. 5, 2014 in 1 page.
Check, http://check.me/ printed Feb. 5, 2014 in 3 pages.

(56) References Cited

OTHER PUBLICATIONS

Comlounge.net, "plonesocial.auth.rpx" http://web.archive.org/web/20101026041841/http://comlounge.net/rpx as captured Oct. 26, 2010 in 9 pages.
"CreditCheck Monitoring Services," Dec. 11, 2000, pp. 1, lines 21-23.
Cullen, Terri; "The Wall Street Journal Complete Identity Theft Guidebook:How to Protect Yourself from the Most Pervasive Crime in America"; Chapter 3, pp. 59-79; Jul. 10, 2007.
"D&B Corporate Family Linkage", D&B Internet Access for U.S. Contract Customers, https://www.dnb.com/ecomp/help/linkage.htm as printed Dec. 17, 2009, pp. 1.
Day, Jo and Kevin; "ID-ology: A Planner's Guide to Identity Theft"; Journal of Financial Planning:Tech Talk; pp. 36-38; Sep. 2004.
Equifax; "Equifax Credit Watch"; https://www.econsumer.equifax.co.uk/consumer/uk/sitepage.ehtml, dated Jun. 27, 2007 on www.archive.org.
Facebook, "Facebook helps you connect and share with the people in your life," www.facebook.com printed Nov. 16, 2010 in 1 page.
FamilySecure.com, "Frequently Asked Questions", http://www.familysecure.com/FAQ.aspx as archived Jul. 15, 2007 in 3 pages.
FamilySecure.com; "Identity Theft Protection for the Whole Family | FamilySecure.com" http://www.familysecure.com/, as retrieved on Nov. 5, 2009.
Fenner, Peter, "Mobile Address Management and Billing for Personal Communications", 1st International Conference on Universal Personal Communications, 1992, ICUPC '92 Proceedings, pp. 253-257.
"Fictitious Business Name Records", Westlaw Database Directory, http://directoy.westlaw.com/scope/default.asp?db=FBN-ALL&RS-W&VR=2.0 as printed Dec. 17, 2009, pp. 5.
Gordon et al., "Identity Fraud: A Critical National and Global Threat," LexisNexis, Oct. 28, 2003, pp. 1-48.
Herzberg, Amir, "Payments and Banking with Mobile Personal Devices," Communications of the ACM, May 2003, vol. 46, No. 5, pp. 53-58.
"ID Thieves These Days Want Your Number, Not Your Name", The Colombus Dispatch, Columbus, Ohio, http://www.dispatch.com/content/stories/business/2014/08/03/id-thieves-these-days-want-your-name-not-your-name.html, Aug. 3, 2014 in 2 pages.
Identity Theft Resource Center; Fact Sheet 120 A—To Order a Credit Report for a Child; Fact Sheets, Victim Resources; Apr. 30, 2007.
"Identity Thieves Beware: Lifelock Introduces Nation's First Guaranteed Proactive Solution to Identity Theft Protection," PR Newswire, New York, Jun. 13, 2005 http://proquest.umi.com/pqdweb?did=852869731&sid=1&Fmt=3&clientId=19649&RQT=309&Vname=PQD.
Information Brokers of America, "Information Brokers of America Child Identity Theft Protection" http://web.archive.org/web/20080706135451/http://iboainfo.com/child-order.html as archived Jul. 6, 2008 in 1 page.
Information Brokers of America, "Safeguard Your Child's Credit", http://web.archive.org/web/20071215210406/http://www.iboainfo.com/child-id-protect.html as archived Dec. 15, 2007 in 1 page.
Intelius, "People Search—Updated Daily, Accurate and Fast!" http://www.intelius.com/people-search.html?=&gclid=CJqZIZP7paUCFYK5KgodbCUJJQ printed Nov. 16, 2010 in 1 page.
Iovation, Device Identification & Device Fingerprinting, http://www.iovation.com/risk-management/device-identification printed Nov. 5, 2012 in 6 pages.
Lanubile, et al., "Evaluating Empirical Models for the Detection of High-Risk Components: Some Lessons Learned", 20th Annual Software Engineering Workshop, Nov. 29-30, 1995, Greenbelt, Maryland, pp. 1-6.
Leskovec, Jure, "Social Media Analytics: Tracking, Modeling and Predicting the Flow of Information through Networks", WWW 2011—Tutorial, Mar. 28-Apr. 1, 2011, Hyderabad, India, pp. 277-278.
Letter to Donald A. Robert from Carolyn B. Maloney, dated Oct. 31, 2007, pp. 2.
Letter to Donald A. Robert from Senator Charles E. Schumer, dated Oct. 11, 2007, pp. 2.
Letter to Harry C. Gambill from Carolyn B. Maloney, dated Oct. 31, 2007, pp. 2.
Letter to Harry C. Gambill from Senator Charles E. Schumer, dated Oct. 11, 2007, pp. 2.
Letter to Richard F. Smith from Carolyn B. Maloney, dated Oct. 31, 2007, pp. 2.
Letter to Richard F. Smith from Senator Charles E. Schumer, dated Oct. 11, 2007, pp. 2.
Lobo, Jude, "MySAP.com Enterprise Portal Cookbook," SAP Technical Delivery, Feb. 2002, vol. 1, pp. 1-13.
Manilla, http://www.manilla.com/how-it-works/ printed Feb. 5, 2014 in 1 page.
Meyers et al., "Using Your Social Networking Accounts to Log Into NPR.org," NPR.org, Jun. 24, 2010, http://web.archive.org/web/20100627034054/http://www.npr.org/blogs/inside/2010/06/24/128079309/using-your-social-networking-accounts-to-log-into-npr-orq in 3 pages.
Micarelli et al., "Personalized Search on the World Wide Web," The Adaptive Web, LNCS 4321, 2007, pp. 195-230.
Microsoft, "Expand the Reach of Your Business," Microsoft Business Solutions, 2004, in 16 pages.
Mint.com, http://www.mint.com/how-it-works/ printed Feb. 5, 2013 in 2 pages.
Mvelopes, http://www.mvelopes.com/ printed Feb. 5, 2014 in 2 pages.
My Call Credit http://www.mycallcredit.com/products.asp?product=ALR dated Dec. 10, 2005 on www.archive.org.
My Call Credit http://www.mycallcredit.com/rewrite.asp?display=faq dated Dec. 10, 2005 on www.archive.org.
"Name Availability Records", Westlaw Database Directory, http://directoy.westlaw.com/scope/default.asp?db=NA-ALL&RS=W&VR=2.0 as printed Dec. 17, 2009, pp. 5.
National Alert Registry Launches RegisteredOffendersList.org to Provide Information on Registered Sex Offenders, May 16, 2005, pp. 2, http://www.prweb.com/printer/240437.htm accessed on Oct. 18, 2011.
National Alert Registry Offers Free Child Safety "Safe From Harm" DVD and Child Identification Kit, Oct. 24, 2006. pp. 2, http://www.prleap.com/pr/53170 accessed on Oct. 18, 2011.
National Alert Registry website titled, "Does a sexual offender live in your neighborhood", Oct. 22, 2006, pp. 2, http://web.archive.org/wb/20061022204835/http://www.nationallertregistry.com/ accessed on Oct. 13, 2011.
Next Card: About Us, http://web.cba.neu.edu/~awatson/NextCardCase/NextCardAboutUs.htm printed Oct. 23, 2009 in 10 pages.
Ogg, Erica, "Apple Cracks Down on UDID Use", http://gigaom.com/apple/apple-cracks-down-on-udid-use/ printed Nov. 5, 2012 in 5 Pages.
Paustian, Chuck, "Every Cardholder a King Customers get the Full Treatment at Issuers' Web Sites," Card Marketing, New York, Mar. 2001, vol. 5, No. 3, pp. 4.
People Finders, http://www.peoplefinders.com/?CMP=Google&utm_source=google&utm_medium=cpc printed Nov. 16, 2010 in 1 page.
People Lookup, "Your Source for Locating Anyone!" www.peoplelookup.com/people-search.html printed Nov. 16, 2010 in 1 page.
People Search, "The Leading Premium People Search Site on the Web," http://www.peoplesearch.com printed Nov. 16, 2010 in 2 pages.
PersonalCapital.com, http://www.personalcapital.com/how-it-works printed Feb. 5, 2014 in 5 pages.
Press Release—"Helping Families Protect Against Identity Theft—Experian Announces FamilySecure.com; Parents and guardians are alerted for signs of potential identity theft for them and their children; product features an industry-leading $2 million guarantee"; PR Newswire; Irvine, CA; Oct. 1, 2007.

(56) References Cited

OTHER PUBLICATIONS

Roth, Andrew, "CheckFree to Introduce E-Mail Billing Serving," American Banker, New York, Mar. 13, 2001, vol. 166, No. 49, pp. 3.
SAS, "SAS® Information Delivery Portal", Fact Sheet, 2008, in 4 pages.
Scholastic Inc.:Parent's Request for Information http://web.archive.org/web/20070210091055/http://www.scholastic.com/inforequest/index.htm as archived Feb. 10, 2007 in 1 page.
Scholastic Inc.:Privacy Policy http://web.archive.org/web/20070127214753/http://www.scholastic.com/privacy.htm as archived Jan. 27, 2007 in 3 pages.
Singletary, Michelle, "The Littlest Victims of ID Theft", The Washington Post, The Color of Money, Oct. 4, 2007.
"TransUnion—Child Identity Theft Inquiry", TransUnion, http://www.transunion.com/corporate/personal/fraudIdentityTheft/fraudPrevention/childIDInquiry.page as printed Nov. 5, 2009 in 4 pages.
US Legal, Description, http://www.uslegalforms.com/us/US-00708-LTR.htm printed Sep. 4, 2007 in 2 pages.
Yahoo! Search, "People Search," http://people.yahoo/com printed Nov. 16, 2010 in 1 page.
YODLEE | Money Center, https://yodleemoneycenter.com/ printed Feb. 5, 2014 in 2 pages.
You Need a Budget, http://www.youneedabudget.com/features printed Feb. 5, 2014 in 3 pages.

\* cited by examiner

PROVIDING CREDIT INQUIRY ALERTS

CROSS REFERENCE TO RELATED APPLICATIONS

This application claims the benefit of U.S. provisional application No. 61/497,826, filed Jun. 16, 2011, U.S. provisional application No. 61/504,955, filed Jul. 6, 2011, and U.S. provisional application No. 61/540,654, filed Sep. 29, 2011, the disclosure of which is each hereby incorporated by reference in its entirety.

BACKGROUND

Field

Among other things, this disclosure describes systems and methods for providing an alert to an individual when an entity requests credit data associated with the individual.

Description of the Related Art

Credit data associated with an individual is often requested and considered by entities such as lenders, credit card providers, banks, car dealers, brokers, etc. when determining whether to extend credit to the individual, whether to allow the individual to open an account, whether to rent to the individual, or in making decisions regarding many other relationships or transactions in which credit worthiness may be factor. An entity requesting credit data, which may include a request for a credit report or a credit score, may submit a credit inquiry to a credit bureau or credit reseller. In some cases, the inquiry may be a soft inquiry, which does not typically adversely affect the consumer's credit standing. In other cases, the inquiry may be a hard inquiry, which may affect the consumer's credit score and be stored in credit data associated with the consumer. For example, when a requesting entity submits a hard inquiry requesting credit data for a given individual to a credit bureau, the credit bureau may provide the requesting entity with the credit data (which may first include authenticating the request), and may record the inquiry in the individual's credit file or credit data, such that the inquiry may subsequently appear in a credit report associated with the individual and be considered in generating a future credit score associated with the individual. Consumers are often advised to periodically monitor their credit reports in order to be aware of inquiries that may potentially be unauthorized or associated with identity fraud. However, there may be substantial delay between the time that an inquiry is received by a credit bureau and the time that the inquiry first appears in a credit report.

SUMMARY OF THE INVENTION

The present disclosure generally relates to generating and delivering an alert to an individual regarding a credit inquiry. For example, in some embodiments, an inquiry request may be received that includes a request for credit data associated with an individual. The inquiry request may be analyzed to identify the individual. An alert may then be generated and provided to the individual based on retrieved contact information associated with the individual, such as contact information stored in association with the individual's enrollment in a credit monitoring service. In some embodiments, the alert is generated regardless of whether the inquiry causes a change to credit data associated with the individual, such that the alert may be generated without monitoring credit data. Accordingly, in some embodiments, the alert may be generated in real-time or substantially in real-time as the credit inquiry is received from the requesting entity.

For purposes of this summary, certain aspects, advantages, and novel features of the invention are described herein. It is to be understood that not necessarily all such advantages may be achieved in accordance with any particular embodiment of the invention. Thus, for example, those skilled in the art will recognize that the invention may be embodied or carried out in a manner that achieves one advantage or group of advantages as taught herein without necessarily achieving other advantages as may be taught or suggested herein.

Figure 1A:
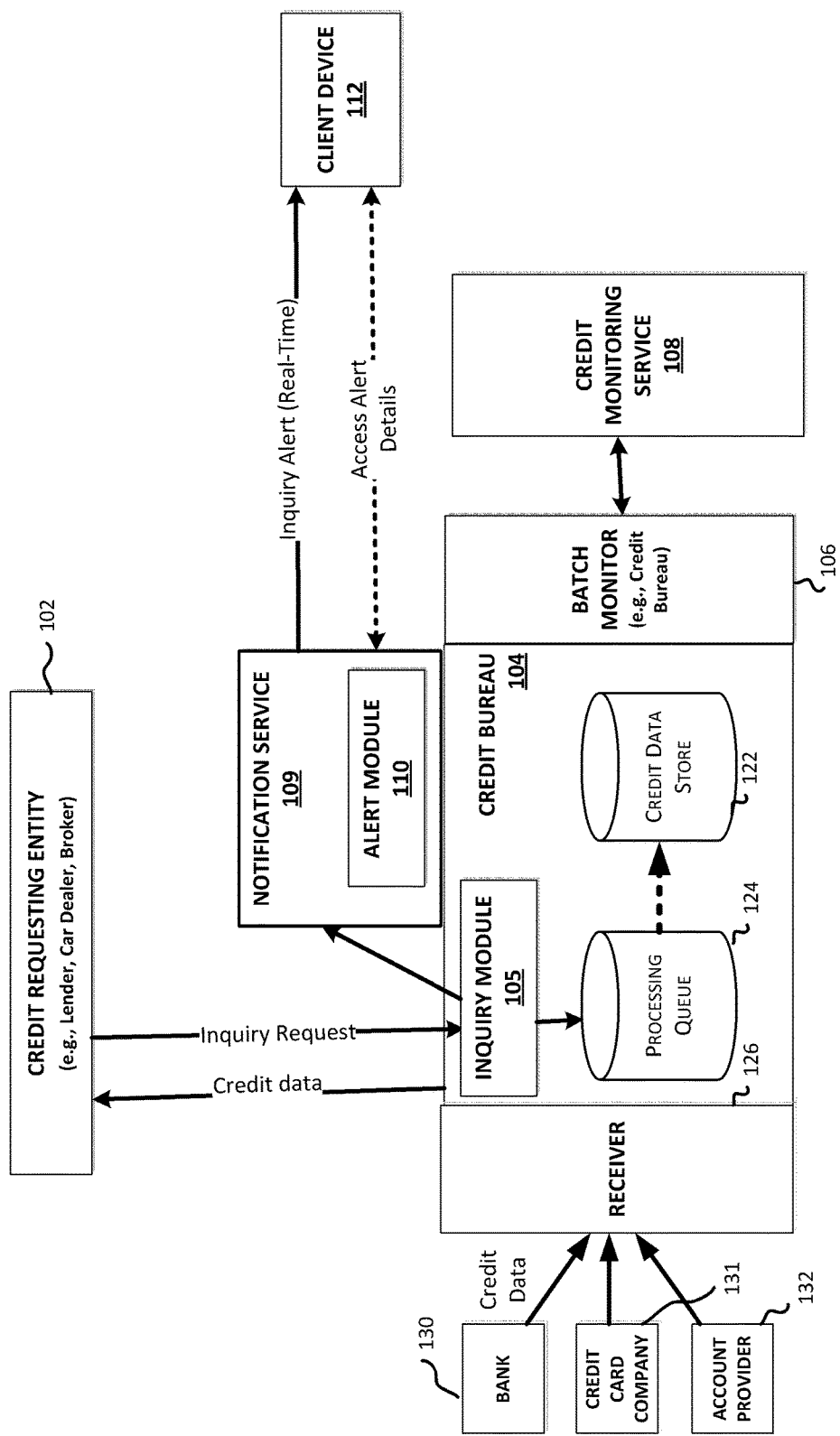
FIG. 1A is a block diagram illustrating an example configuration for providing real-time consumer alerts in response to credit inquiry requests, according to certain embodiments.

These and other features will now be described with reference to the drawings summarized above. The drawings and the associated descriptions are provided to illustrate certain embodiments and not to limit the scope of the invention. Throughout the drawings, reference numbers may be re-used to indicate correspondence between referenced elements.

DETAILED DESCRIPTION

Various embodiments of systems, methods, processes, and data structures will now be described with reference to the drawings. Variations to the systems, methods, processes, and data structures that represent other embodiments will also be described.

An alert system as described herein may, in some embodiments, include an alert module that generates and/or delivers inquiry alerts to consumers. The alert system may include an enrollment component that enables a user to enroll in monitoring, an alert component that provides detection of alert triggering events (such as a credit inquiry or a request for credit data) and delivery of alerts to one or more consumers. In some embodiments, an alert system may additionally include a resolution component that provides resolution of credit inquiries that a consumer identifies, in response to an alert, as fraudulent, not approved, inaccurate, or otherwise in need of resolution.

For example, the enrollment component may be offered via a monitoring service that enrolls consumers in an identity monitoring service. The alert component may be provided via one or more alert providers that detect or receive notification of an inquiry related to a consumer's credit data, and then provide one or more alerts in association with the monitoring service. For example, an alert provider may have a relationship with a credit bureau such that inquiry requests that are received by the credit bureau are provided to the alert provider even prior to the credit bureau processing the inquiry request and, thus, the alert provider may provide inquiry alerts to consumers irrespective of any changes that may be made to the consumer's credit data at the credit bureau. Furthermore, in some embodiments the alert provider may be an intermediary that receives credit inquiries directly from requesting entities and transmits the credit inquiries to one or more credit bureaus after (or concurrently with) extraction of information regarding consumers in the credit inquiries and initiation of alert transmission to the consumers.

The monitoring service may attempt to identify the user as an enrolled member of the monitoring service. If the user is identified as enrolled in the monitoring service, an alert indicating the credit inquiry may be transmitted to the consumer using contact information provided in the consumer's account associated with the monitoring service. In some embodiments, the alert component may generate an alert without reference to credit data associated with the consumer, such that the alert is generated based on an inquiry itself, rather than based on monitoring changes to credit data. Depending on the embodiment, the alert that is transmitted to the consumer may include details regarding the credit inquiry, such as the name of the requesting entity and time of the inquiry, or the alert may include a notification that a credit inquiry has been made for the consumers credit data along with information that will allow the consumer to access further details regarding the credit inquiry, such as via an online credit monitoring portal or a call-in customer service number.

Although the description provided herein refers to individuals, consumers, or customers, the terms "user," "individual," "consumer," and "customer" may, according to some embodiments, include groups of individuals, such as, for example, married couples or domestic partners, organizations, groups, and business entities.

The alert provider, which may be associated with a credit bureau, credit reseller, and/or a credit monitoring service, may generate and/or transmit alerts in response to a requesting entity's inquiry request, which may be a request for credit data associated with an individual, such as the individual's credit report. In other embodiments, alerts may be provided in response to various triggering events, including, for example, an authentication request (which may be associated with a credit request or sent prior to a credit request). Other triggering events, in some embodiments, may include submission of a credit application (such as for a mortgage, a revolving loan, or a credit card), a consumer's request for access to his own personal credit report and/or credit score, or submission of non-credit applications (such as new accounts for financial services, utilities, leasing, renting, and telephone service).

In some embodiments, alerts may be generated very quickly (e.g., in real-time or substantially in real-time) after the inquiry request or other triggering event occurs. For example, alerts may be transmitted within seconds of the triggering event occurring. In some embodiments, the generated alert may be provided to the user in real-time once the alert is generated. In other embodiments, the generated alert may be stored for later delivery to the individual. For example, in some such embodiments, alerts may be transmitted in batches, where the batch processing may occur frequently, such as every N seconds or minutes. In yet other embodiments, generated and stored alerts may be transmitted in a more delayed manner to the user, such as part of an hourly or nightly batch processing, or other batch processing.

FIG. 1A is a block diagram illustrating an example configuration of a system that provides real-time consumer alerts in response to credit inquiry requests. In the embodiment illustrated, credit data is shown being received by a receiver 126 of a credit bureau 104 from various entities, such as a bank 130, a credit card company 131 and an account provider 132. Credit data may additionally be received from lenders and/or other financial institutions (not illustrated). The credit bureau includes a processing queue 124 for receiving and routing the incoming credit data. Tradeline data, e.g., information regarding credit and debit accounts of the consumer, may be transmitted to the credit data store 122. For example, a credit module operated by the credit bureau 104 may determine appropriate credit data and other consumer information to be stored in credit data store 122 based at least in part on the data received from the various entities 130-132.

Figure 1B:
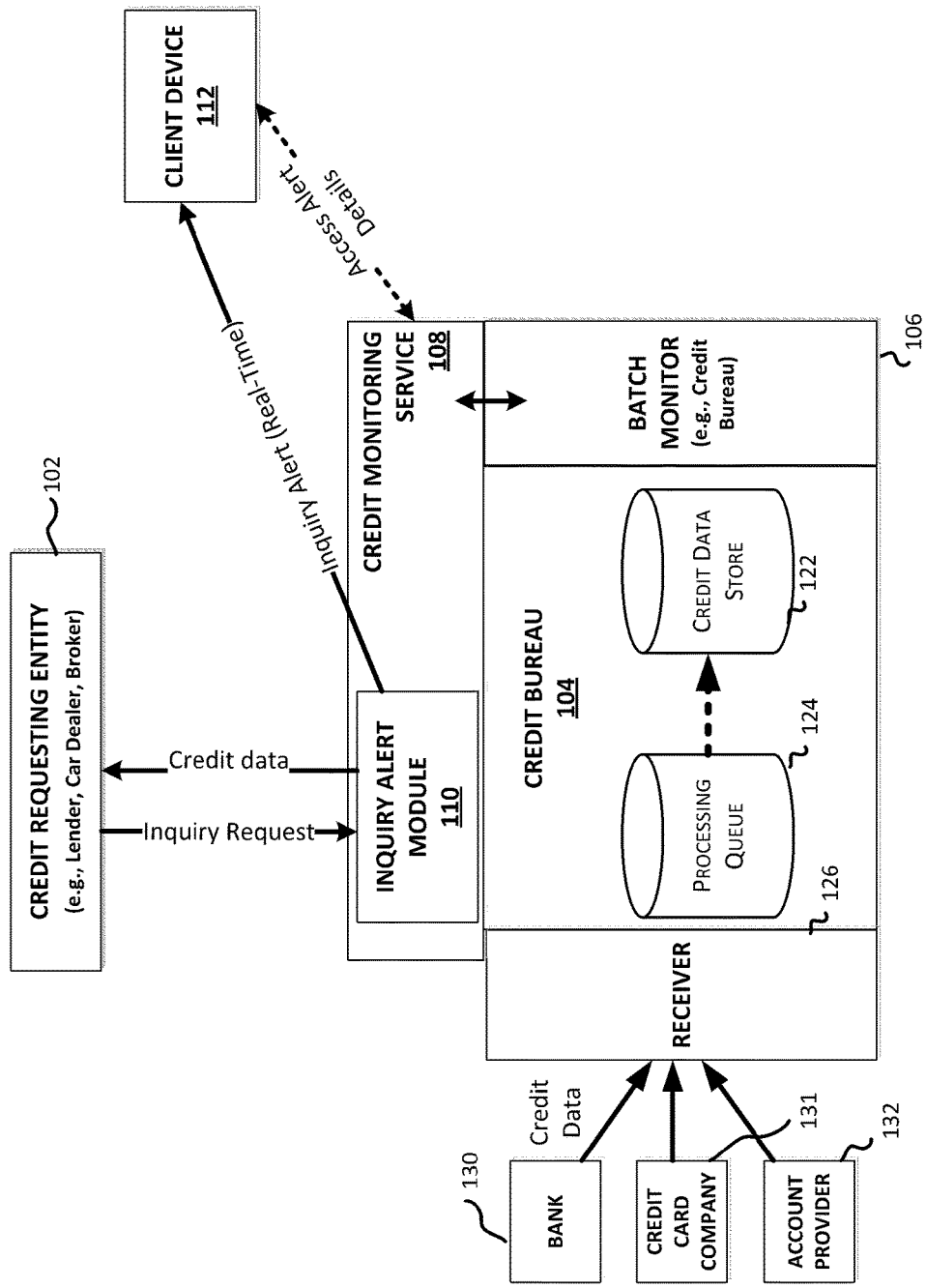
FIG. 1B is a block diagram illustrating another example configuration for providing real-time consumer alerts in response to credit inquiry requests, according to certain embodiments in which an inquiry alert module is operated in association with a credit monitoring service.
Figure 1C:
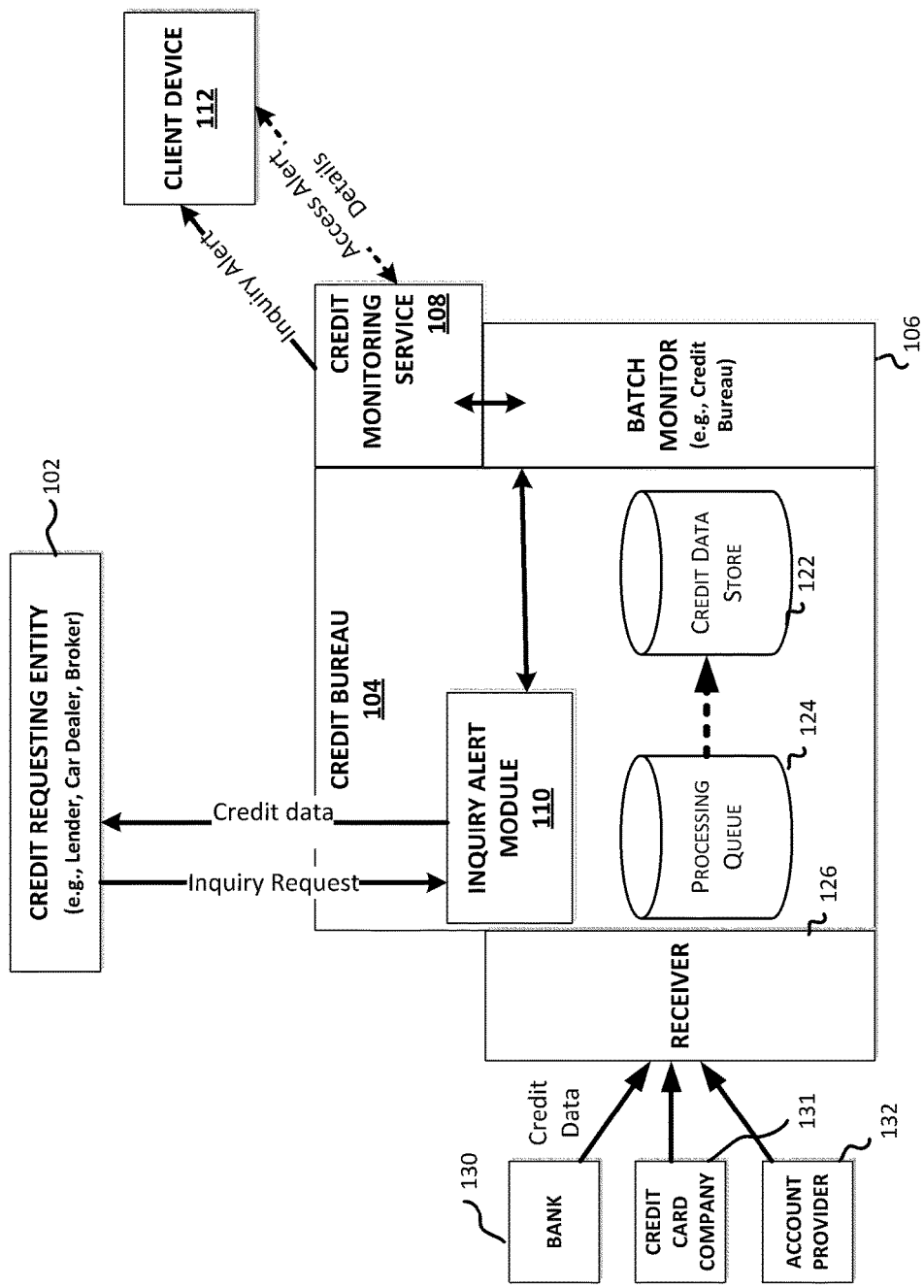
FIG. 1C is a block diagram illustrating another example configuration for generating real-time alerts in response to credit inquiry requests, where the generated alerts are provided to a consumer during a batch process.

The credit data store 122 may be monitored periodically, such as via a batch process, to identify changes to credit data stored by the credit bureau. For example, the credit bureau may nightly scan the credit data store for changes to consumer credit files. In one embodiment, the batch monitor 106 looks for changes to credit files of consumers that are enrolled in a credit monitoring service of one or more affiliates of the credit bureau. A credit monitoring service may generally include a service with which individuals maintain an account in order to be alerted when a change posts to the individual's credit data or credit report, which may include an inquiry being noted in the individual's credit data. In the embodiment of FIG. 1, a consumer credit monitoring service 108 performs and/or requests that the batch monitor 106 perform a batch process to identify changes to credit data associated with customers of the consumer credit monitoring service 108. For example, the credit monitoring service may periodically pull identified credit changes and determine which alerts correspond to customers of the credit monitoring service. Once customers for particular changes are identified, information regarding the change may be transmitted to the consumer. In other embodiments, the batch processing blocks illustrated in FIG. 1A-1C may be performed by a single entity or may be separated in any other manner. A few hours to a few days may pass between the credit data being received by the credit bureau and the provision of notifications to consumers regarding changes to the affected consumer.

Also shown in FIG. 1A are requests for consumer credit data that might be received by an inquiry module 105 of the credit bureau 104 (or an affiliate of the credit bureau) from a credit requesting entity 102. Credit requesting entities, such as credit requesting entity 102, may include lenders, car dealers, brokers, retailers, landlords, and/or any other entity that is interested in consumer credit data. Requests for credit data are generally referred to herein as inquiries, inquiry requests or credit inquiry requests. In addition to providing the requested credit data (such as a credit report regarding the consumer) to the credit requester, inquiry requests may be recorded in the credit file of the consumer, which may be stored in credit data store 122. Thus, inquiry requests can be monitored by the batch monitoring processes that are performed by the credit bureau 104 (such as by batch monitor 106) and/or an affiliate of the credit bureau (such as by credit monitoring service 108), which may include a credit data reseller or a third-party credit monitoring service. However, providing alerts in this manner may result in the customer of a credit monitoring service receiving notification of an inquiry request days after the inquiry request was made. If the inquiry request was fraudulent (e.g., made by someone that was not authorized to receive credit data associated with the customer and/or to open a credit account in the name of the customer), the customer would be better served to receive the notification earlier, such that action may be taken to minimize damage to the customer's identity, finances and/or credit file.

In the embodiment of FIG. 1A, the inquiry module 105 of the credit bureau 104 interfaces with a notification service 109 in order to provide consumers with real-time notifications of inquiry requests, which may be generated by alert module 110. The notification service 109 may be operated by or associated with the credit bureau 104, may be affiliated with a partner of the credit bureau, or may be operated by a third-party entity. In this embodiment, the inquiry module 105, which initially receives the inquiry request from the credit requesting entity 102 in the illustrated embodiment, provides inquiry request notices to the notification service 109 upon receipt of a new inquiry alert from a credit requesting entity 102. For example, the credit bureau may provide the inquiry request notices to the notification service 109 prior to providing the requested credit data to the credit requesting entity 102 and/or recording the inquiry request in the consumer's credit data (e.g., prior to storing data associated with the inquiry request in credit data store 122). In other embodiments, the inquiry module 105 may provide the inquiry request notices to the notification service 109 substantially contemporaneously with recording the inquiry request in the consumer's credit data and/or retrieving credit data to provide to the credit requesting entity. In either case, the inquiry module 105 and the notification service 109 do not need to monitor the credit data (such as the data stored in credit data store 122) in order to identify inquiry requests and provide alerts to consumers. Rather, the notification service 109 may receive inquiry request notices directly from the alert module 110 (e.g., operated by the credit bureau 104) and may provide real-time alerts to the corresponding consumer, possibly before credit data is provided to the credit requestor or prior to a new credit line being opened using the consumer's identity. In this way, the consumer is provided with an opportunity to more quickly take action in response to potentially fraudulent use of the consumer's identity, or to more quickly resolve inaccuracies in the consumer's credit file.

Credit inquiry alerts may be provided to the consumer in various manners, as described further below. For example, as illustrated in the various illustrative embodiments shown in FIGS. 1A-1C, inquiry alerts generated by the alert module 110 may be sent to a client device 112 by a notification service 109 or a credit monitoring service 108. Similarly, the consumer may access alert details by requesting additional information from notification service 109 (such as in the embodiment illustrated in FIG. 1A) or from a credit monitoring service 108 (such as in the embodiment illustrated in FIG. 1B). The alert module 110 or a credit monitoring service 108 may retrieve contact information for the individual from an account data store operated by the credit monitoring service or the notification service, which may include an email address, telephone number, account user name, etc. The alert module 110 may send or otherwise provide an alert to the consumer and/or a client device 112 associated with the consumer based on the retrieved contact information. Alerts may be delivered via any medium, such as, for example, an online portal that is accessible to alert members (e.g., a credit monitoring website), SMS text message, push notification to a mobile device (e.g., to a credit monitoring mobile application), email, printed digests, a mobile application, automated or personal telephone call, etc. In some embodiments, the alert may include detailed information associated with the inquiry, such as information identifying the credit requesting entity 102, the time of the inquiry, the data requested (e.g., whether a full credit report was requested), etc. In other embodiments, the alert may not include any specific information regarding the inquiry, but may notify the user that he should access his account with the credit monitoring service 108 and/or review his credit data with credit bureau 104 in order to obtain further details.

FIG. 1B is a block diagram illustrating another example configuration for providing real-time consumer alerts in response to credit inquiry requests, according to certain embodiments in which an inquiry alert module 110 is operated in association with a credit monitoring service 108. In the illustrated embodiment, the alert module 110 may receive the inquiry request directly from the credit requesting entity 102. For example, the alert module 110 associated with the credit monitoring service 108 may receive the inquiry request, then may forward the inquiry request to the credit bureau 104 for processing, while providing an inquiry alert to the client device 112 prior to the inquiry being processed by the credit bureau. In other embodiments, the credit requesting entity 102 may send the inquiry request (or notification of an inquiry request) to the inquiry module 110 while also sending an inquiry request directly to the credit bureau 104.

In one embodiment, detailed information regarding the inquiry request may be made available to the consumer via a credit monitoring user interface (e.g., the consumer may access a credit monitoring account associated with a credit monitoring service via a web browser to receive detailed information). For example, a user may use the client device 112 to access alert details stored at the credit monitoring service 108. Depending on the embodiment, the alert details may not be available to the consumer for some time after the inquiry request alert is received since the credit monitoring service may receive the information only after one or more batch processes are performed on the credit data stored by the credit bureau. For example, in some embodiments, when the inquiry request is received by the alert module 110 (or an inquiry request is otherwise detected by the alert module), an inquiry alert may be transmitted to the consumer (in real-time) with an indication that further information regarding the inquiry is available, or will soon be available, from the credit monitoring service, for example. In one embodiment, the further information regarding the inquiry is available after completion of a next batch process performed by the batch monitor 106. Thus, in this embodiment the user is provided with a real-time alert indicating that the inquiry into the consumer's credit he has been made, and is given the opportunity to obtain further information regarding the inquiry alert from the credit monitoring service 108 (or directly from the alert module 110 in some embodiments), such as within one to three days after the inquiry is received by the credit bureau. In other embodiments, detailed information regarding the inquiry request is obtained by the alert module 110 prior to, or concurrently with, the inquiry being received and processed by the credit bureau. In such an embodiment, the consumer may have immediate access to detailed information regarding the inquiry alert and may have increased opportunities to reduce fraudulent use of the consumer's identity.

FIG. 1C is a block diagram illustrating another example configuration for generating real-time alerts in response to credit inquiry requests, where the generated alerts are provided to a consumer during a batch process. In the illustrated embodiment, the alert module 110 may be operated by the credit bureau 104 or a credit reseller that receives the credit inquiry request from the credit requesting entity 102. The alert module 110 may generate a real-time or near real-time alert in response to receiving the inquiry request. In the embodiment illustrated in FIG. 1C, the alert module may store the generated alert such that the batch monitor 106 may retrieve the generated alert and provide the alert to a credit monitoring service 108 for delivery to the consumer. The credit monitoring service may receive or retrieve generated alerts from the batch monitor 106, for example, during a batch process, similar to those discussed above. In some embodiments, the alert module may generate and store the alert prior to or in parallel with the credit bureau's normal processing of the inquiry request and retrieval of credit data, such that the alert is generated prior to any changes being made to credit data. Accordingly, even if the batch process is executed in a manner such that the generated alert is not provided to the user for a few minutes or hours after the inquiry request is received by the alert module 110, the alert may nonetheless be provided to the client device in association with an earlier batch process than would be typical in the case of an alert that is generated by monitoring changes to credit data.

Figure 2:
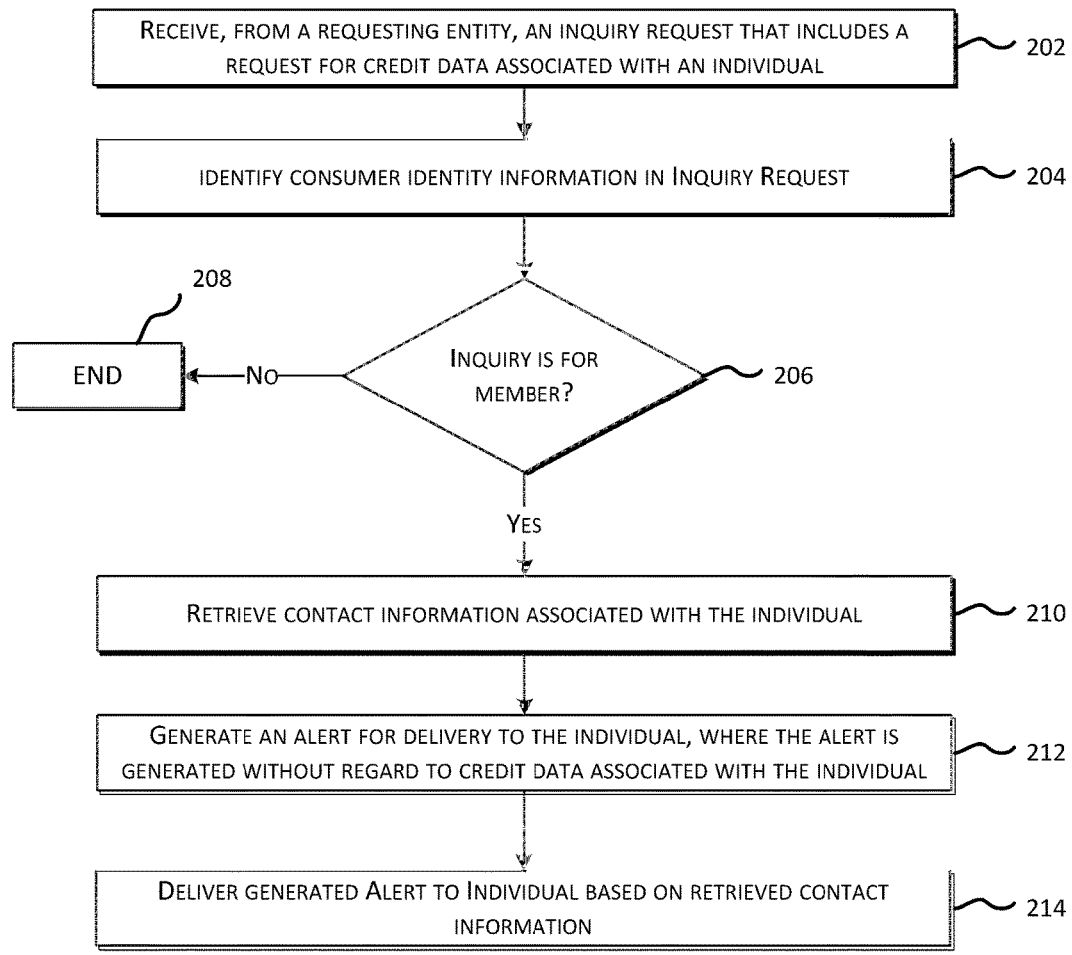
FIG. 2 is a flowchart illustrating one embodiment of a method for providing a real-time inquiry alert to a user.

FIG. 2 is a flowchart illustrating one embodiment of a method for providing a real-time inquiry alert to a user. Depending on the embodiment, the method of FIG. 2 may include additional or fewer blocks and/or the blocks may be performed in a different order than is illustrated. For ease of discussion, the method of FIG. 2 is described below as being completed by the alert module 110. However, the method may be implemented by any other device, or combination of devices, such as computing devices associated with a credit bureau, an affiliate or credit reseller associated with a credit bureau, and/or a credit monitoring service.

The illustrative method begins at block 202, where the alert module 110 receives an inquiry request requesting credit data associated with an individual. The inquiry request may include, for example, a request for a credit report, a credit score, and/or specific portions or fields of credit data associated with the individual. In some embodiments, the credit inquiry may be sent by a computing system associated with the requesting entity 102 to a credit bureau or credit reseller, which may in turn provide the inquiry or notification of the inquiry to the alert module 110. For example, the credit bureau or credit reseller may operate in a manner in which notification of a credit inquiry is automatically sent or otherwise provided to the alert module when the inquiry is received, such that the alert module 110 may process the inquiry notification for alert purposes in parallel with, prior to, or otherwise without regard to the credit bureau's processing of the request for credit data. In other embodiments, the alert module 110 may receive the credit inquiry directly from the credit requesting entity.

At block 204, the alert module 110 analyzes the inquiry request to identify consumer identity information associated with the inquiry request. In some embodiments, analyzing the inquiry request may include parsing the request to extract consumer identity information, such as a name, social security number, address, employer, etc.

Next, in block 206 the alert module determines whether the consumer identity information associated with the inquiry request matches identity information of a member of the credit monitoring service. For example, the alert module may be operated by a credit bureau, notification service, credit monitoring service, and/or other provider that provides inquiry alerts to individuals that requested to be members of such a service. In other embodiments, an inquiry alert service as described herein may be offered in association with a related product or service, such that inquiry alerts may be sent to members of the related product or service, provided that the member has not opted out of receiving inquiry alerts. The alert module 110 may determine whether the inquiry request is for credit data of a member of the credit monitoring service (or a related notification service) by determining whether the consumer identity information extracted from the inquiry request (block 204) matches member information data retrieved from one or more data stores (e.g., stored by the credit monitoring service 108). In some embodiments, a confidence score may be generated indicating the confidence that the inquiry request is for credit data of a given member. If the confidence score for a given member is above a certain threshold value, the alert module may determine that the inquiry request is for credit data of the given member.

If the alert module determines at block 206 that the inquiry request is not associated with a member of the credit monitoring service, the illustrative method may end at block 208. If the alert module instead determines that that the inquiry request is associated with a member of the credit monitoring service (or a related service), the illustrative method proceeds to block 210, where the alert module 110 retrieves contact information associated with the individual. In some embodiments, the contact information may be retrieved from a data store associated with members of the notification service, such that the contact information includes contact details provided by the individual when signing up for the service. In other embodiments, the contact information may alternatively or additionally be retrieved from one or more other data sources, such as from profile data or account data maintained by a third-party service with which the individual maintains contact information and/or other personal information. The retrieved contact information may include, for example, a phone number, email address, mailing address, account name or user name, IP address, or device identifier. In some embodiments, the alert module may additionally retrieve contact preferences associated with the individual, such as information identifying a preferred contact method and/or rules associated with contacting the individual (such as time windows in which the user would like to be contacted, identification of situations in which different contact methods should be employed, etc.).

Next, at block 212, the alert module 110 generates an alert for delivery to the individual, where the alert may be generated without regard to credit data associated with the individual. For example, in some embodiments, generation of the alert may be based on the inquiry being received, rather than being based on an identified change to stored credit data. In some embodiments, generating an alert may include storing information indicating that an alert associated with the individual is available, such that the individual will be notified of the alert at a later time, such as during a batch process. In other embodiments, the generated alert may be delivered or otherwise provided to the user immediately after the alert is generated. The information included in the generated alert may be limited, in some embodiments, to an indication that an inquiry has been received regarding the individual. In other embodiments, the generated alert may include details regarding the inquiry, such as information identifying the requesting entity (such as a financial institution or other entity described above), a third party associated with the requesting entity (such as a retail store associated with a credit card issuer that submitted the inquiry), a time and date of the inquiry, the data requested (e.g., whether a full credit report was requested), and/or a geographic location associated with the inquiry.

Once the alert has been generated, the alert module 110 delivers or sends the generated alert to the individual (such as to a client computing device associated with the individual) based on the contact information retrieved at block 210. As will be appreciated, the alert may be provided in a variety of ways depending on the contact information, contact preferences and/or the embodiment. For example, providing the alert may include, but is not limited to, sending a text message, sending an email, making a phone call, leaving a voicemail, sending a letter, providing alert information when the user logs into an account or launches an application, etc. In some embodiments, an alert may be delivered to the individual regardless of whether the inquiry is a hard inquiry of soft inquiry. In other embodiments, alerts may only be provided to the user for hard inquiries. In embodiments in which an individual may receive an alert associated with a soft inquiry, the alert may notify the user that there "may" be a change to the user's credit report, since a soft inquiry might never post to the individual's credit report.

In some embodiments, the alert module 110 may communicate with the credit bureau 104 and/or credit requesting entity 102 to operate in a closed loop manner. For example, in one embodiment the credit bureau may wait for confirmation from the consumer that credit information may be released to the credit requesting entity 102 before providing the consumer's credit information to the credit requesting entity. For example, the inquiry alert may request that the user respond within a specified time period indicating whether the credit data should be released to the credit requesting entity 102, and may default to either releasing or not releasing the data if no response is received, depending on the embodiment.

As noted above, in some embodiments, alerts may provide the receiving consumers the ability to allow or deny a credit data request or inquiry before credit data or other information is provided to the requesting entity (e.g., a merchant, bank, lender, etc.). For example, the consumer may receive an alert indicating that credit information for the consumer has been requested by a given entity. If the consumer is not familiar with the entity, the consumer can respond to the alert requesting that the requested credit information not be provided to the requesting entity. The response may also indicate that the requesting entity should be provided with an indication that the request may be associated with actions of an identity thief. Additionally, the response may request one or more protective actions, such as putting a freeze on the consumer's credit file. These actions may be selected individually or collectively based on the consumer's preferences, for example. In other embodiments, fewer or additional actions may be taken in response to a consumer indicating that a received alert is not a result of activity by the consumer. In one embodiment, an electronic alert may include a link or button that the user can select in order to allow the credit data to be provided in response to the inquiry and a link or button that the user can select in order to prevent the credit data from being provided.

In one embodiment, the credit bureau or other credit data provider may wait a predetermined time (e.g., a customizable time between 15 seconds to 10 minutes) after receiving an inquiry before providing the requested credit data to the requesting entity. This provides the consumer with time to respond to the request in order to stop the credit data from being released in the event that the consumer has not authorized the request or believes that the request may be associated with identity fraud. In another embodiment, the requested credit data is not provided to the requesting entity until an affirmative response is provided by the consumer.

In some embodiments, when a consumer indicates that a credit inquiry was not approved or may be associated with a fraudulent use of personal information (such as in an embodiment in which a requesting entity may authenticate an individual's identity in association with the credit inquiry), a resolution component may enable the consumer to initiate and manage resolution. For example, the consumer may be provided with contact information for the entity that was provided with the consumer's personal information and/or credit data (e.g., the requesting entity, such as a bank or merchant) so that the consumer can contact the requesting entity to work towards resolution and/or contact a fraud resolution service to help resolve the issue. In some embodiments, the consumer alert system may enable the user to opt to have a full service resolution performed. For example, the consumer may pay a fee to have the monitoring service resolve the issue (e.g., without requiring the consumer to contact the requesting entity or the fraud resolution service). Such full service resolution may be partially or fully automated by the providing entity. In some embodiments, the resolution component may resolve the issue without further involvement of the requesting entity. In other embodiment, the resolution component may resolve the issue in coordination with the requesting entity. In other embodiments, a passive inquiry alert may be generated and provided to a user without a resolution component associated with the alert.

Example System Architecture

Figure 3:
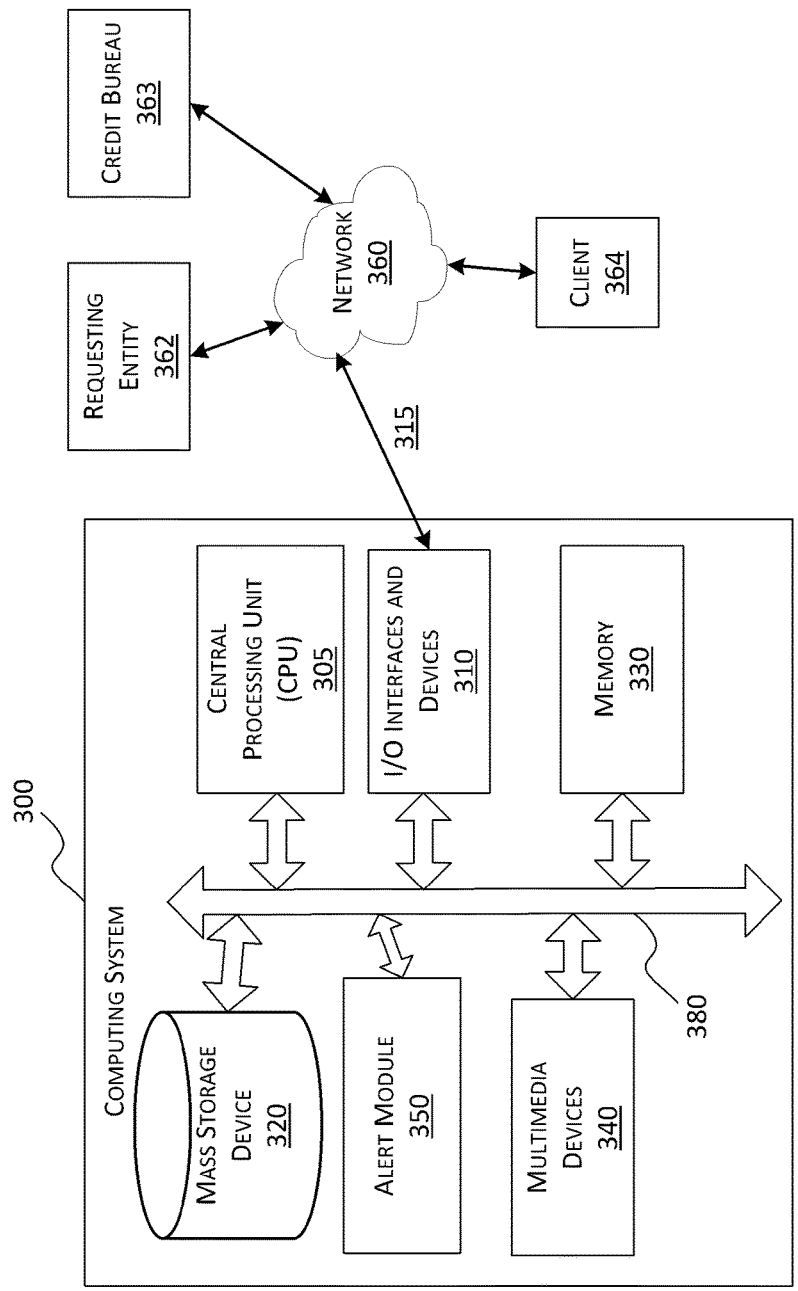
FIG. 3 illustrates one embodiment of a system that implements aspects of the present disclosure, such as providing inquiry alerts to a user.

FIG. 3 is a block diagram illustrating an example configuration for providing real-time consumer alerts in response to credit inquiry requests, according to certain embodiments. In the illustrated embodiment, a computing system 300, which includes an alert module 350, is in communication with a network 360 and various systems are also in communication with the network 360. The computing system 300 may be used to implement systems and methods described herein. For example, the computing system 300 may be associated with a notification service that generates inquiry alerts and/or provides inquiry alerts to a user. Alternatively, a credit bureau, credit data reseller or credit monitoring service may each include a computing system similar to that of FIG. 3.

The computing system 300 includes, for example, a personal computer that is IBM, Macintosh, or Linux/Unix compatible or a server or workstation. In one embodiment, the computing system 300 comprises a server, a laptop computer, a cell phone, a personal digital assistant, a kiosk, or an audio player, for example. In one embodiment, the exemplary computing system 300 includes one or more central processing unit ("CPU") 305, which may each include a conventional or proprietary microprocessor. The computing system 300 further includes one or more memory 330, such as random access memory ("RAM") for temporary storage of information, one or more read only memory ("ROM") for permanent storage of information, and one or more mass storage device 320, such as a hard drive, diskette, solid state drive, or optical media storage device. Typically, the modules of the computing system 300 are connected to the computer using a standard based bus system 380. In different embodiments, the standard based bus system could be implemented in Peripheral Component Interconnect ("PCI"), Microchannel, Small Computer System Interface ("SCSI"), Industrial Standard Architecture ("ISA") and Extended ISA ("EISA") architectures, for example. In addition, the functionality provided for in the components and modules of computing system 300 may be combined into fewer components and modules or further separated into additional components and modules.

The computing system 300 is generally controlled and coordinated by operating system software, such as Windows XP, Windows Vista, Windows 7, Windows Server, Unix, Linux, SunOS, Solaris, or other compatible operating systems. In Macintosh systems, the operating system may be any available operating system, such as MAC OS X. In other embodiments, the computing system 300 may be controlled by a proprietary operating system. Conventional operating systems control and schedule computer processes for execution, perform memory management, provide file system, networking, I/O services, and provide a user interface, such as a graphical user interface ("GUI"), among other things.

The exemplary computing system 300 may include one or more commonly available input/output (I/O) devices and interfaces 310, such as a keyboard, mouse, touchpad, and printer. In one embodiment, the I/O devices and interfaces 310 include one or more display devices, such as a monitor, that allows the visual presentation of data to a user. More particularly, a display device provides for the presentation of GUIs, application software data, and multimedia presentations, for example. The computing system 300 may also include one or more multimedia devices 340, such as speakers, video cards, graphics accelerators, and microphones, for example.

In the embodiment of FIG. 3, the I/O devices and interfaces 310 provide a communication interface to various external devices. In the illustrated embodiment, the computing system 300 is electronically coupled to a network 360, which comprises one or more of a LAN, WAN, and/or the Internet, for example, via a wired, wireless, or combination of wired and wireless, communication link 315. The network 360 communicates with various computing devices and/or other electronic devices via wired or wireless communication links.

According to FIG. 3, information is provided to the computing system 300 over the network 360 from one or more data sources including, for example, the requesting entity 362, credit bureau 363, and/or a credit data reseller. The information supplied by the various data sources may include a credit inquiry, notification of a credit inquiry, an inquiry alert, and/or other information, such as credit data, personal information, application information, and/or other like data, for example. In addition to the devices that are illustrated in FIG. 3, the network 360 may communicate with other data sources or other computing devices. In addition, the data sources may include one or more internal and/or external data sources. In some embodiments, one or more of the databases or data sources may be implemented using a relational database, such as Sybase, Oracle, CodeBase and Microsoft® SQL Server as well as other types of databases such as, for example, a flat file database, an entity-relationship database, and object-oriented database, and/or a record-based database.

A client computer 364 may be connected to the network 360 and used by a user to receive and respond to alerts provided by the computing system 300. The client computer 364 may be a desktop computer, a mobile computer, or any other mobile device such as a mobile phone or other similar handheld computing devices. The client computer 364 may include the same or similar components to those discussed above with reference to the computing system 300.

In the embodiment of FIG. 3, the computing system 300 also includes an alert module 350 that may be stored in the mass storage device 320 as executable software codes that are executed by the CPU 305. This module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. In the embodiment shown in FIG. 3, the computing system 300 is configured to execute the alert module 350 in order to receive indication of a credit inquiry request, generate credit inquiry alerts, identify contact information for the consumers, transmit alerts to the consumers, and/or receive feedback from the consumers regarding the provided alerts, as well as any other functionality described elsewhere in this specification.

In general, the word "module," as used herein, refers to logic embodied in hardware or firmware, or to a collection of software instructions, possibly having entry and exit points, written in a programming language, such as, for example, Java, Lua, C or C++. A software module may be compiled and linked into an executable program, installed in a dynamic link library, or may be written in an interpreted programming language such as, for example, BASIC, Perl, or Python. It will be appreciated that software modules may be callable from other modules or from themselves, and/or may be invoked in response to detected events or interrupts. Software modules configured for execution on computing devices may be provided on a computer readable medium, such as a compact disc, digital video disc, flash drive, or any other tangible medium. Such software code may be stored, partially or fully, on a memory device of the executing computing device, such as the computing system 300, for execution by the computing device. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

All of the methods and processes described above may be embodied in, and partially or fully automated via, software code modules executed by one or more general purpose computers. The methods may be executed on the computing devices in response to execution of software instructions or other executable code read from a tangible, non-transitory computer readable medium. A tangible computer readable medium is a data storage device that can store data that is readable by a computer system. Examples of computer readable mediums include read-only memory, random-access memory, other volatile or non-volatile memory devices, CD-ROMs, magnetic tape, flash drives, and optical data storage devices.

Although this disclosure has been described in terms of certain example embodiments and applications, other embodiments and applications that are apparent to those of ordinary skill in the art, including embodiments and applications that do not provide all of the benefits described herein, are also within the scope of this disclosure.

All publications- and patent applications mentioned in this specification are herein incorporated by reference in their entirety to the same extent as if each individual publication or patent application was specifically and individually indicated to be incorporated by reference.

What is claimed is:

1. A system comprising:
a data store that stores information associated with one or more individuals, wherein the information includes member information indicating respective individuals enrolled in a notification service;
a computing device in communication with the data store and that is configured to:
receive an inquiry request from a requesting entity, wherein the inquiry request includes a request for credit data associated with an individual, wherein the inquiry request is received by an inquiry module configured to receive the inquiry request prior to the inquiry request causing any change to credit data associated with the individual in a credit bureau database;
determine that the individual is enrolled in the notification service based at least in part by comparing information associated with the inquiry request and member information retrieved from the data store, wherein the information compared includes at least one of a name, a social security number or an address; and
in response to receiving the inquiry request and determining that the individual is enrolled in the notification service:
determine a time period of a predetermined length during which the individual may respond to an alert to be generated by the system, wherein the time period is set to be a predetermined number of seconds or minutes, wherein the system is configured to release credit data associated with the individual to the requesting entity as a default action at the end of the time period unless a response to the alert is received by the system during the time period;
retrieve contact information associated with the individual from the data store, wherein the retrieved contact information includes at least one of a phone number, an IP address, or a device identifier associated with a mobile device of the individual;
generate the alert for delivery to the individual, the alert including information identifying the requesting entity, wherein the alert is generated (a) substantially in real time when the request for credit data is received and (b) before or contemporaneously with a processing by a credit bureau of the request for credit data, wherein the alert includes a selectable option that enables the individual to indicate via interacting with the alert on the mobile device that the individual does not authorize credit data to be provided to the requesting entity;
electronically provide the alert to the individual based on the retrieved contact information, wherein electronically providing the alert to the individual comprises sending the alert to the mobile device of the individual as a push notification to an application operating on the mobile device of the individual that includes the selectable option as at least one of a link or a button, wherein electronically providing the alert includes delivering the alert to the mobile device such that the alert activates the application on the mobile device to cause display of the information identifying the requesting entity and the selectable option that enables connection to the computing device over the Internet;
receive a response, during the time period, from the mobile device of the individual indicating that the selectable option within the alert was selected; and
based on the response received from the mobile device of the individual, prevent the system from completing the default action of releasing credit data associated with the individual to the requesting entity at the end of the time period;
wherein the alert is generated without reference to credit data or financial data associated with the individual and is generated regardless of whether the inquiry request causes a change to credit data associated with the individual.

2. The system of claim 1, wherein the alert is generated prior to the inquiry request being processed by either a credit bureau or a credit data reseller.

3. The system of claim 1, wherein the alert is generated contemporaneously with the inquiry request being processed by a credit bureau or a credit data reseller.

4. The system of claim 1, wherein the alert is generated prior to any change being made to credit data based on the inquiry request.

5. A computer-implemented method comprising:
receiving, by a computing system comprising one or more computing devices configured with specific executable instructions, an inquiry request from a requesting entity, wherein the inquiry request includes a request for credit data associated with an individual, wherein the inquiry request is received prior to the inquiry request causing any change to credit data associated with the individual in a credit bureau database;
in response to receiving the inquiry request:
establishing, by the computing system, a time period of a predetermined length during which the individual may respond to an alert to be generated by the system, wherein the time period is set to be a predetermined number of seconds or minutes, wherein the computing system is configured to release credit data associated with the individual to the requesting entity as a default action at the end of the time period unless a response to the alert is received by the computing system during the time period;

retrieving, by the computing system, contact information associated with the individual from an electronic data store, wherein the retrieved contact information includes at least one of a phone number, an IP address, or a device identifier associated with a mobile device of the individual;

generating, by the computing system, the alert for delivery to the individual, the alert including information identifying the requesting entity, wherein the alert is generated (a) substantially in real time when the request for credit data is received and (b) before or contemporaneously with a processing by a credit bureau of the request for credit data, wherein the alert includes a selectable option that enables the individual to indicate that the individual does not authorize credit data to be provided to the requesting entity electronically providing the alert to the individual based on the retrieved contact information, wherein electronically providing the alert to the individual comprises sending, by the computing system, the alert to the mobile device of the individual as a push notification to an application operating on the mobile device of the individual that includes the selectable option as at least one of a link or a button wherein electronically providing the alert includes delivering the alert to the mobile device such that the alert activates the application on the mobile device to cause display of the selectable option that enables connection to the computing system over the Internet;

receiving a response, by the computing system during the time period, from the mobile device of the individual indicating that the selectable option within the alert was selected; and based on the response received from the mobile device of the individual, automatically preventing the computing system from completing the default action of releasing credit data associated with the individual to the requesting entity at the end of the time period;

wherein the alert is provided to the individual prior to the inquiry request causing any change to credit data associated with the individual.

6. The computer-implemented method of claim 5, wherein the alert is provided to the individual based at least in part on contact information associated with enrollment by the individual in a notification service.

7. The computer-implemented method of claim 5, wherein the alert comprises information identifying the requesting entity associated with the inquiry request.

8. The computer-implemented method of claim 5, wherein the computing system that generates the alert is associated with a credit bureau or a credit reseller.

9. The computer-implemented method of claim 5, wherein the alert is generated in association with a credit monitoring service.

* * * * *